US011279032B2

(12) United States Patent
Bergantz et al.

(10) Patent No.: US 11,279,032 B2
(45) Date of Patent: Mar. 22, 2022

(54) APPARATUS, SYSTEMS, AND METHODS FOR IMPROVED JOINT COORDINATE TEACHING ACCURACY OF ROBOTS

(71) Applicant: Applied Materials, Inc., Santa Clara, CA (US)

(72) Inventors: Nicholas Michael Bergantz, Sunnyvale, CA (US); Ali Utku Pehlivan, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 137 days.

(21) Appl. No.: 16/844,765

(22) Filed: Apr. 9, 2020

(65) Prior Publication Data

US 2020/0324410 A1    Oct. 15, 2020

Related U.S. Application Data

(60) Provisional application No. 62/832,585, filed on Apr. 11, 2019.

(51) Int. Cl.
  *B25J 9/16*    (2006.01)
(52) U.S. Cl.
  CPC ............ *B25J 9/1664* (2013.01); *B25J 9/163* (2013.01)
(58) Field of Classification Search
  CPC ................... B25J 9/1664; B25J 9/163; G05B 2219/45032
  USPC .................................................. 700/245–264
  See application file for complete search history.

(56) References Cited

U.S. PATENT DOCUMENTS

| 4,763,276 | A  | * | 8/1988  | Perreirra | B25J 9/1653 |
|           |    |   |         |           | 700/254 |
| 5,297,238 | A  | * | 3/1994  | Wang      | B25J 9/1692 |
|           |    |   |         |           | 700/254 |
| 6,323,616 | B1 |   | 11/2001 | Sagues    |             |
| 6,489,741 | B1 | * | 12/2002 | Genov     | B25J 9/163  |
|           |    |   |         |           | 318/561 |
| 6,643,563 | B2 | * | 11/2003 | Hosek     | B25J 9/1664 |
|           |    |   |         |           | 414/754 |
| 7,039,498 | B2 |   | 5/2006  | Bacchi    |             |
| 7,572,092 | B2 |   | 8/2009  | Hofmeister |            |
| 7,792,350 | B2 |   | 9/2010  | Kiley et al. |          |

(Continued)

FOREIGN PATENT DOCUMENTS

| JP | 2012-231041 A | 11/2012 |
| KR | 10-1957096 B1 | 3/2019 |
| WO | 03-022534 A1  | 3/2003 |

OTHER PUBLICATIONS

International Search Report and Written Opinion dated Jul. 22, 2020, on application No. PCT/US2020/027768.

*Primary Examiner* — Jaime Figueroa
(74) *Attorney, Agent, or Firm* — Lowenstein Sandler LLP

(57) ABSTRACT

A method includes positioning a robot in a plurality of postures in a substrate processing system relative to a fixed location in the substrate processing system and generating sensor data identifying a fixed location relative to the robot in the plurality of postures. The method further includes determining, based on the sensor data, a plurality of error values corresponding to one or more components of the substrate processing system and causing, based on the plurality of error values, performance of one or more corrective actions associated with the one or more components of the substrate processing system.

20 Claims, 8 Drawing Sheets

(56) References Cited

U.S. PATENT DOCUMENTS

| | | | |
|---|---|---|---|
| 7,874,782 B2* | 1/2011 | Hashimoto | H01L 21/67766 414/217 |
| 7,904,202 B2* | 3/2011 | Hoppe | B25J 9/1692 700/245 |
| 8,397,739 B2 | 3/2013 | Gregor et al. | |
| 8,784,033 B2 | 7/2014 | Kremerman et al. | |
| 9,252,035 B2* | 2/2016 | Furuichi | H01L 21/677 |
| 9,457,464 B2 | 10/2016 | Kremerman et al. | |
| 9,579,788 B2 | 2/2017 | Rosenberg et al. | |
| 9,881,820 B2 | 1/2018 | Wong et al. | |
| 9,908,236 B2* | 3/2018 | Minami | B25J 9/042 |
| 9,947,517 B1 | 4/2018 | Luere et al. | |
| 10,014,198 B2 | 7/2018 | Richardson | |
| 10,041,868 B2 | 8/2018 | Gottscho | |
| 10,062,589 B2 | 8/2018 | Wong et al. | |
| 10,062,590 B2 | 8/2018 | Wong et al. | |
| 10,062,599 B2 | 8/2018 | Genetti et al. | |
| 10,103,010 B2 | 10/2018 | Luere et al. | |
| 10,124,492 B2 | 11/2018 | Genetti et al. | |
| 2005/0228542 A1* | 10/2005 | Stone | H01L 21/68 700/245 |
| 2010/0174398 A1* | 7/2010 | Kobayashi | H01L 21/681 700/114 |
| 2013/0275057 A1* | 10/2013 | Perlin | G06F 3/005 702/41 |
| 2013/0319137 A1* | 12/2013 | Grau | G06F 3/04144 73/862.381 |
| 2014/0350713 A1* | 11/2014 | Kimura | H01L 21/68707 700/213 |
| 2016/0211165 A1 | 7/2016 | McChesney et al. | |
| 2016/0211166 A1 | 7/2016 | Fan et al. | |
| 2016/0216185 A1 | 7/2016 | Gottscho | |
| 2017/0053819 A1 | 2/2017 | Richardson | |
| 2017/0106533 A1* | 4/2017 | Minami | B25J 11/0095 |
| 2017/0113355 A1 | 4/2017 | Genetti et al. | |
| 2017/0115657 A1 | 4/2017 | Trussell et al. | |
| 2017/0117172 A1 | 4/2017 | Genetti et al. | |
| 2017/0119339 A1 | 5/2017 | Johnson et al. | |
| 2017/0133283 A1 | 5/2017 | Kenworthy | |
| 2017/0213758 A1 | 7/2017 | Rice et al. | |
| 2017/0236688 A1 | 8/2017 | Caron et al. | |
| 2017/0236741 A1 | 8/2017 | Angelov et al. | |
| 2017/0236743 A1 | 8/2017 | Severson et al. | |
| 2017/0263478 A1 | 9/2017 | McChesney et al. | |
| 2017/0287682 A1 | 10/2017 | Musselman et al. | |
| 2017/0287753 A1 | 10/2017 | Musselman et al. | |
| 2017/0330786 A1 | 11/2017 | Genetti et al. | |
| 2017/0334074 A1 | 11/2017 | Genetti et al. | |
| 2018/0019107 A1 | 1/2018 | Ishizawa | |
| 2018/0019142 A1 | 1/2018 | Wong et al. | |
| 2018/0032062 A1 | 2/2018 | Trussell et al. | |
| 2018/0040492 A1 | 2/2018 | Wong et al. | |
| 2018/0068879 A1 | 3/2018 | Wong et al. | |
| 2018/0090354 A1 | 3/2018 | Sugita et al. | |
| 2018/0166259 A1 | 6/2018 | Ueda | |
| 2018/0218933 A1 | 8/2018 | Luere et al. | |
| 2018/0233328 A1 | 8/2018 | Ueda et al. | |
| 2018/0277416 A1 | 9/2018 | Takahashi et al. | |
| 2018/0301322 A1 | 10/2018 | Sugita et al. | |
| 2018/0315583 A1 | 11/2018 | Luere et al. | |
| 2018/0315640 A1 | 11/2018 | Ueda et al. | |
| 2020/0254625 A1* | 8/2020 | Rogers | B25J 9/1692 |

* cited by examiner

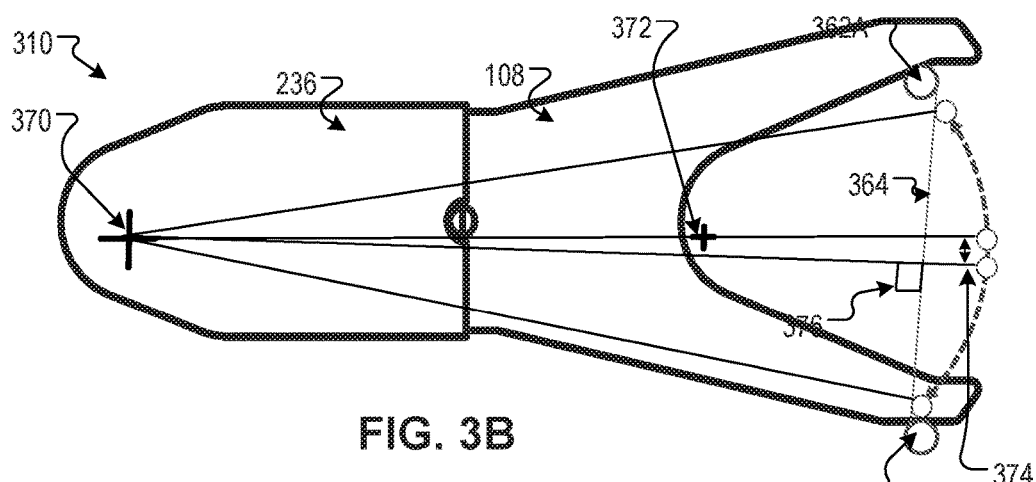
FIG. 3B
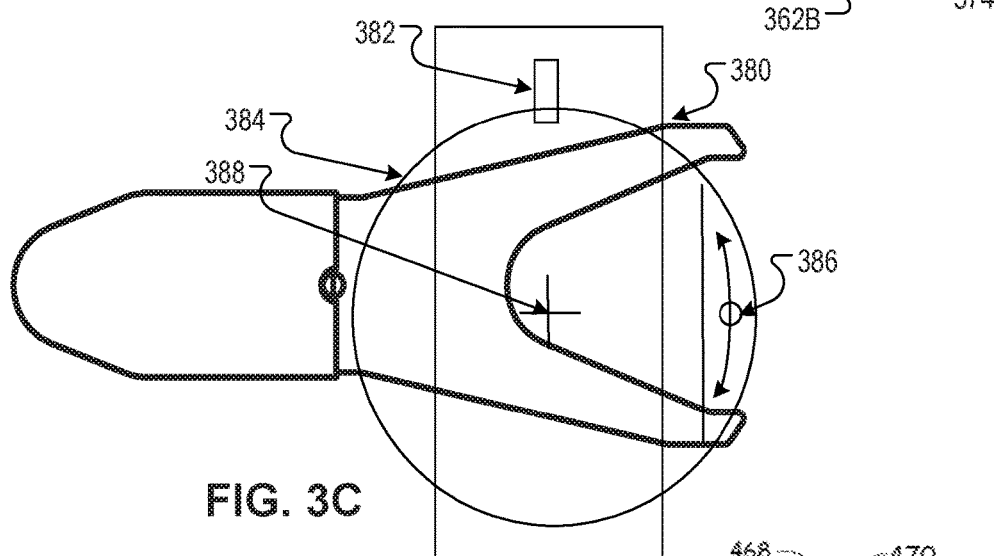
FIG. 3C
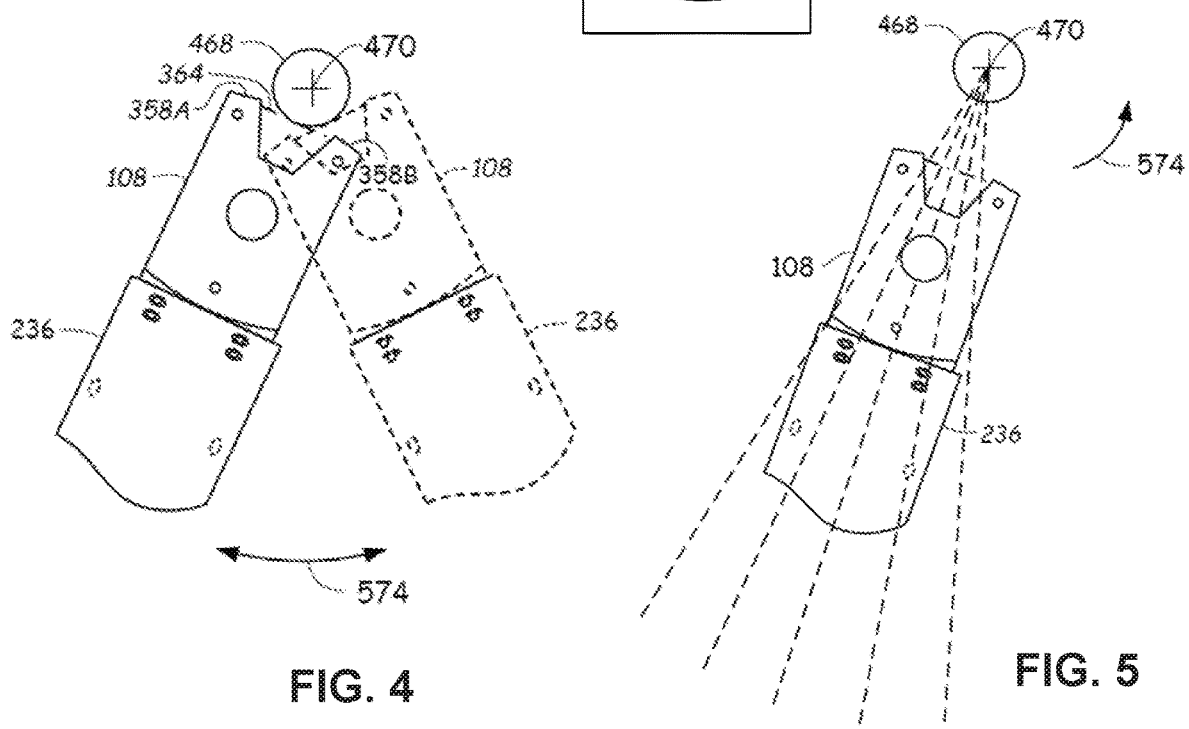
FIG. 4
FIG. 5

APPARATUS, SYSTEMS, AND METHODS FOR IMPROVED JOINT COORDINATE TEACHING ACCURACY OF ROBOTS

RELATED APPLICATION

This application claims benefit of U.S. Provisional Application No. 62/832,585, filed Apr. 11, 2019, the content of which is hereby incorporated by reference in its entirety.

TECHNICAL FIELD

Embodiments of the present disclosure relate to apparatuses, systems, and methods for improved joint coordinate teaching accuracy of robots.

BACKGROUND

Electronic device manufacturing systems, such as substrate processing systems, include multiple process chambers and load lock chambers. Such chambers are included in cluster tools where a plurality of process chambers are distributed about a transfer chamber, for example. Electronic device manufacturing systems also include a factory interface and storage areas (e.g., front opening unified pods (FOUPs)). Electronic device manufacturing systems employ articulated robots or multi-arm robots, which are housed within the transfer chamber to transport substrates between the various process chambers and load lock chambers and are housed within the factory interface to transport substrates between the storage areas and the load lock chambers. For example, the robots transport substrates from chamber to chamber, from load lock chambers to process chambers, from process chambers to load lock chambers, from load lock chambers to storage areas, and/or from storage areas to load lock chambers. Efficient and precise transport of substrates between the various portions of the electronic device manufacturing system improves system throughput, thus lowering overall operating costs.

In many single blade (e.g., end effector) and dual blade robots, a wrist to which each of the single or dual blades are attached is capable of independent rotation, referred to as yaw rotation. In some examples, each robot employs three arms (upper arm, forearm, and wrist) driven by one or more motors. In some examples, each robot also employs four arms (upper arm, forearm, additional arm, and wrist) driven by one or more motors. In each of these robots, the wrist is capable of independent yaw rotation. A blade is coupled to a wrist and is used to carry content (e.g., a substrate) to or pick content (e.g., a substrate) from a destination such as a process chamber or a load lock chamber.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes positioning a robot in a plurality of postures in a substrate processing system relative to a fixed location in the substrate processing system; generating sensor data identifying the fixed location relative to the robot in the plurality of postures; determining, based on the sensor data, a plurality of error values corresponding to one or more components of the substrate processing system; and causing, based on the plurality of error values, performance of one or more corrective actions associated with the one or more components of the substrate processing system.

In another aspect of the disclosure, a non-transitory machine-readable storage medium storing instructions which, when executed cause a processing device to perform operations including: positioning a robot in a plurality of postures in a substrate processing system relative to a fixed location in the substrate processing system; generating sensor data identifying the fixed location relative to the robot in the plurality of postures; determining, based on the sensor data, a plurality of error values corresponding to one or more components of the substrate processing system; and causing, based on the plurality of error values, performance of one or more corrective actions associated with the one or more components of the substrate processing system.

In another aspect of the disclosure a system includes a memory and a processing device coupled to the memory. The processing device is to position a robot in a plurality of postures in a substrate processing system relative to a fixed location in the substrate processing system; generate sensor data identifying the fixed location relative to the robot in the plurality of postures; determine, based on the sensor data, a plurality of error values corresponding to one or more components of the substrate processing system; and cause, based on the plurality of error values, performance of one or more corrective actions associated with the one or more components of the substrate processing system.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

FIGS. 3A-C illustrates top views of single end effectors of robots with beam sensors, according to certain embodiments.

FIG. 4 illustrates a top plan view of an end effector detecting the location of a pin, according to the certain embodiments.

FIG. 5 illustrates a top view of an end effector with a beam sensor in several positions detecting a pin, according to certain embodiments.

DETAILED DESCRIPTION

Figure 1:
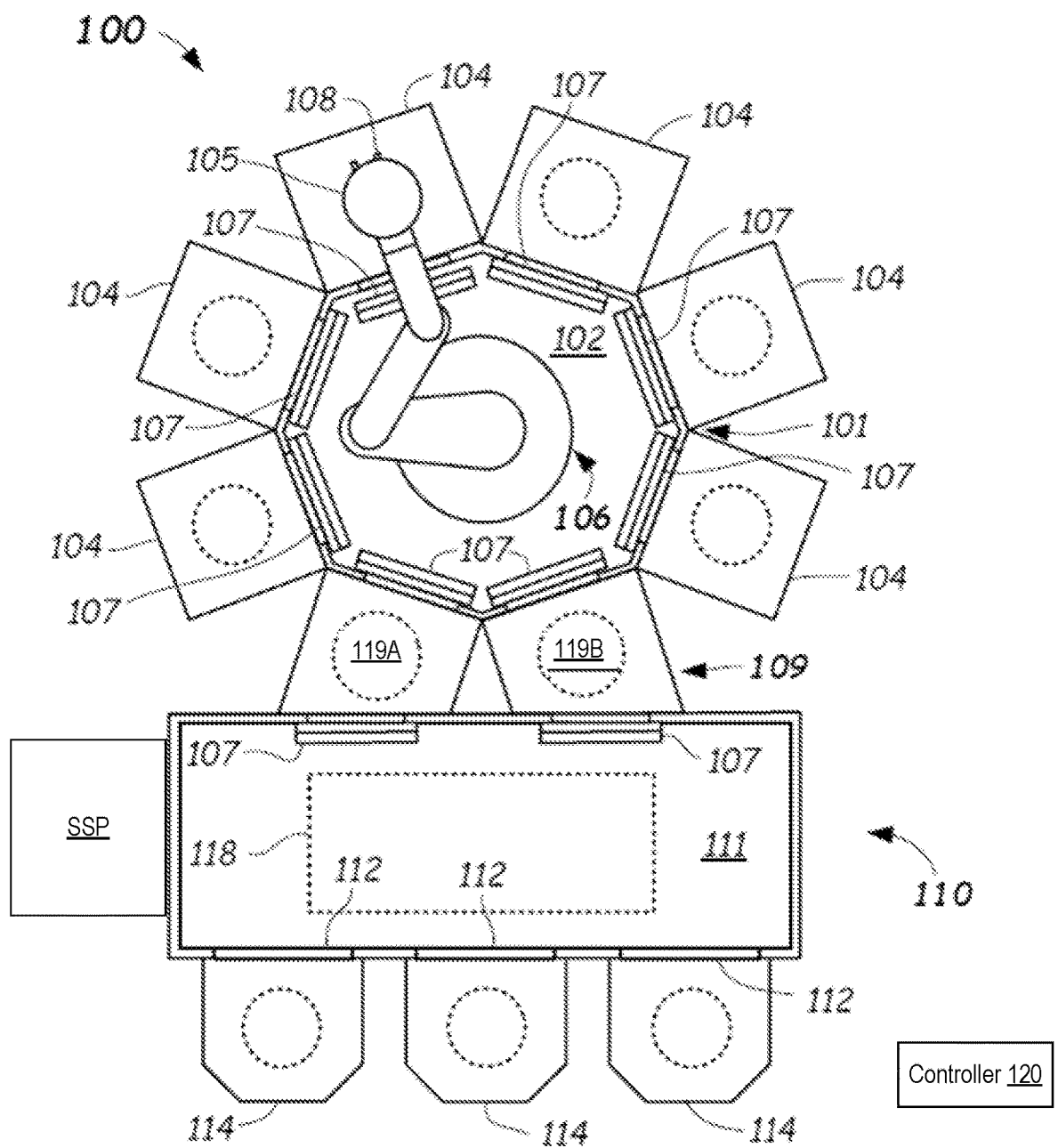
FIG. 1 illustrates a schematic top view of a substrate processing system, according to certain embodiments.

Embodiments described herein are related to joint coordinate teaching accuracy of robots. In substrate processing systems, a robot (e.g., atmospheric robot, factory interface robot, etc.) is located in the factory interface and transfers content (e.g., substrates, process kit rings, etc.) between portions of the substrate processing system, such as enclosure systems (e.g., FOUP, a side storage pod (SSP)), an aligner device, a load lock, and/or the like. A robot (e.g., vacuum robot, transfer chamber robot, etc.) is located in the transfer chamber and transfers content between portions of the substrate processing system, such as processing chambers, load locks, local center finding (LCF) device, and/or the like. In substrate processing (e.g., electronic device manufacturing), it is a goal to achieve very precise and rapid transport of content between various specific locations. In particular, blades or end effectors of robots are oriented precisely relative to content that the robots transport and the portions of the substrate processing system that the robots service (e.g., process chambers, load lock, FOUP, etc.). In some instances, improper orienting results in uneven processing and diminished quality of the substrates as a result of misaligned substrate handoffs. In some instances, robots, aligner devices, and/or LCF devices with errors cause damage to content, portions of the substrate processing system, and/or themselves. Some robots suffer from certain orientation problems as a result of joint errors introduced during joint coordinate teaching of the robot.

In a multi-link robots, joint error contributes significantly to robot teaching accuracy. For example, joint kinematic error, joint hysteresis, and joint backlash are each a corresponding type of joint error that contributes significantly to position errors experienced by multi-link robots.

Conventionally, teaching a location, calibrating, and diagnosing malfunctioning components (e.g., determining errors, speed dropping below a threshold speed, etc.) of the robot, aligner device, and/or LCF device are manual processes. For the manual process, a technician opens the substrate processing system (resulting in exposing a sealed environment within a factory interface and/or transfer chamber of the substrate processing system to atmosphere), manually handles the robot arm (potentially introducing contaminants to the robot arm), and manually performs teaching, calibration, and diagnosis. After being opened, the substrate processing system goes through a long requalification process, during which the substrate processing system is not used to process substrates. The requalification process impacts line yield, scheduling, quality, user time, energy used, and so forth.

The devices, systems, and methods disclosed herein provide improved joint coordinate teaching accuracy of robots. The apparatus, systems, and methods disclosed herein reduce the effects of joint errors during teaching (e.g., auto teaching) of the robots. In some embodiments, a processing device (e.g., controller of the substrate processing system) positions a robot in a plurality of postures in the substrate processing system relative to a fixed location in the substrate processing system. In some embodiments, the fixed location is a pin located in an enclosure system (e.g., FOUP, SSP), on an aligner device, on a LCF device, at a loadlock, and/or the like. In some embodiments, the robot includes multiple components, such as an end effector, a wrist member, a forearm, an upper arm, and/or the like.

The processing device further generates sensor data identifying the fixed location relative to the robot in the different postures. In some embodiments, the robot is positioned in different postures by isolating one portion of the robot and only moving that portion of the robot. A first portion of the sensor data is generated while only moving the wrist member of the robot about the first joint of the robot, a second portion of the sensor data is generated while only moving the forearm of the robot about a second joint of the robot, etc.

The processing logic further determines, based on the sensor data, a plurality of error values corresponding to one or more components of the substrate processing system. In some examples, an error value corresponding to the wrist member of the robot is determined based on the sensor data. In some examples, an error value corresponding the aligner device is determined based on the sensor data.

The processing device further causes, based on the plurality of error values, performance of one or more corrective actions associated with the one or more components of the substrate processing system. In some examples, responsive to determining an error value associated with the wrist member (e.g., directing the wrist member to rotate to a first angle actually causes the wrist member to rotate to a second angle different from the first angle), the processing device uses that error value to cause the wrist member to rotate to a correct angle. In some examples, upon determining an increasing error value over time, preventative maintenance, replacement of one or more components, or the like is performed. In some examples, a first corrective action (e.g., calibration, auto teaching, diagnosing, etc.) is performed for the robot and then a second corrective action is determined for a different component (e.g., aligner device, LCF device, etc.) of the substrate processing system using the robot.

In some embodiments, the error values are determined by training a machine learning model. Historical sensor data (e.g., position data, images, etc.) and historical error values (e.g., averages, from third party sensors, from an aligner device, from an LCF device, etc.) are received and a machine learning model is trained with data input including the historical sensor data and target output including the historical error values to generate the trained machine learning model. The sensor data is provided as input into the trained machine learning model, output indicative of predictive data is obtained from the trained machine learning model, and the error values are determined based on the predictive data.

The devices, systems, and methods described herein have advantages over conventional solutions. The error values for the components of the substrate processing system are determined without opening of the substrate processing system and without a subsequent requalification process of the substrate processing system (e.g., enable performance of the operations while maintaining a sealed environment). Maintaining a sealed environment prevents harmful gases from exiting the substrate processing system, prevents contamination from entering the substrate processing system, and maintains an inert environment and/or vacuum level within corresponding portions of the substrate processing system. Errors of specific components are determined to improve auto teaching, calibration, and diagnosis (e.g., of the specific components, of the robot, of the aligner, of the LCF device, of the substrate processing system, etc.). This enables the robot to be controlled to remove content and place content in specific locations and enables the aligner device and LCF device to more accurately align content. In doing so, this reduces errors in processing content and reduces damage to the robots, enclosure systems, and/or the substrate processing system. The solutions described herein have less impact on line yield, scheduling, quality, user time, energy used, and so forth than conventional solutions.

Apparatus, systems, and methods for improved joint coordinate teaching accuracy of robots is for purposes of illustration, rather than limitation. In some embodiments, the solutions described herein are used to perform corrective actions other than joint coordinate teaching accuracy, such as for performing corrective actions associated with a fiber beam offset relative to a wafer center of a blade of the robot, motor or gear transmission error per each joint of the robot, elliptical joint error of the robot, link zeroing offset of the robot, and/or the like. In some embodiments, the solutions described herein are used to perform corrective actions for components other than the robot, such as the aligner device, LCF device, and/or the like.

FIG. 1 illustrates a top, schematic diagram of a processing system 100 (e.g., an electronic device processing apparatus, a substrate processing system). The processing system 100 transfers content (e.g., substrates, process kit rings, carriers, validation wafers, components, etc.) between different portions of the processing system 100. The processing system 100 is adapted to process substrates 105 (e.g., 300 mm or 450 mm silicon-containing wafers, silicon plates, or the like) by imparting one or more processes thereto (e.g., via one or more process chambers 104). The processes include degassing, cleaning, pre-cleaning, deposition such as chemical vapor deposition (CVD), physical vapor deposition (PVD), atomic layer deposition, coating, oxidation, nitration, etching, polishing, lithography, and/or the like. In some embodiments, the processing system 100 includes process chambers 104 that include one or more of etch chambers, deposition chambers (including atomic layer deposition, chemical vapor deposition, physical vapor deposition, or plasma enhanced versions thereof), anneal chambers, and/or the like.

The depicted processing system 100 includes a mainframe housing 101 including a transfer chamber 102 formed therein. The transfer chamber 102 is formed by a lid (removed for illustration purposes), a bottom, and side walls, and is maintained at a vacuum in some embodiments, for example. The mainframe housing 101 includes any suitable shape, such as square, rectangular, pentagon, hexagon, heptagon, octagon (as shown), or other geometric shapes. In the depicted embodiment, a robot 106, such as a multi-arm robot, is received at least partially inside of the transfer chamber 102. The robot 106 is adapted to be operable therein to service various chambers (e.g., one or more process chambers 104 and/or one or more load lock chambers 109) arranged around the transfer chamber 102. "Service" as used herein includes to place or pick content (e.g., a substrate 105, process kit ring, etc.) into or out of a chamber (e.g., a process chamber 104 and/or a load lock chambers 109) with an end effector 108 of the robot 106. The transfer chamber 102 depicted in FIG. 1 is coupled to six process chambers 104 and two load lock chambers 109. However, other numbers of process chambers 104 and load lock chambers 109 are used in other embodiments.

The robot 106 is adapted to pick and place content, such as substrates 105 (sometimes referred to as "wafers" or "semiconductor wafers"), mounted on the end effector 108 (sometimes referred to as a "blade") of the robot 106 to or from destinations through one or more slit valve assemblies 107. In the depicted embodiment of FIG. 1, the robot 106 is any suitable multi-arm robot that has sufficient mobility to transfer substrates 105 between the various process chambers 104 and/or the load lock chambers 109.

In the depicted embodiment of FIG. 1, the robot 106 is shown located and housed in a transfer chamber 102. However, it should be recognized that this embodiment of the robot 106, as well as the other robots described herein, are used in other areas of electronic device manufacturing, such as in electronic front end module (EFEM) 110 (e.g., factory interface) where the robot transports content (e.g., substrates 105) between load ports of substrate carriers 114 (e.g., enclosure systems, FOUPs, etc.) and load lock chambers 109, for example. The robot 106 described herein is also capable of other transporting uses.

The load lock chambers 109 are adapted to interface with an interface chamber 111 of the EFEM 110. The EFEM 110 receives content (e.g., substrates 105) from substrate carriers 114, such as front opening unified pods (FOUPs) docked at load ports 112. A robot 118 (load/unload robot, factory interface robot, atmospheric robot, EFEM robot, etc.) (shown dotted) is used to transfer substrates 105 between the substrate carriers 114 and the load lock chambers 109. In some embodiments, the robot 118 has the same or similar components (e.g., end effector 108, etc.) and functionalities as the robot 106. Slit valve assemblies 107 are provided at some or all of the openings into the process chambers 104 and also at some or all of the openings of the load lock chambers 109.

Robot 118 includes a robot arm, such as a selective compliance assembly robot arm (SCARA) robot. Examples of a SCARA robot include a 2 link SCARA robot, a 3 link SCARA robot, a 4 link SCARA robot, and so on. The robot 118 includes an end effector 108 on an end of the robot arm. The end effector 108 is configured to pick up and handle specific objects, such as substrates. Alternatively, or additionally, the end effector 108 is configured to handle objects such as a calibration substrate and process kit rings (edge rings). The end effector 108 is also configured to scan objects (e.g., pin, autoteach pin, calibration pin, etc.) located at fixed locations. The robot 118 has one or more links or members (e.g., wrist member, upper arm member, forearm member, etc.) that are configured to be moved to move the end effector 108 in different orientations and to different locations.

The robot 118 is configured to transfer objects between substrate carriers 114 (e.g., cassettes, FOUPs) (or load ports), load locks 119A, 119B, SSP, aligner device, and/or the like. While conventional systems are associated with opening of (e.g., disassembly of, breaking the seal of, contaminating, etc.) a processing system (e.g., EFEM) by an operator to determine error values and perform corrective actions for (e.g., teach, calibrate, and/or diagnose malfunctioning of) a robot (e.g., of factory interface robot), the processing system 100 is configured to facilitate determining of error values and performing of corrective actions (e.g., automatic teaching, calibrating, and/or diagnosis) without opening of (e.g., disassembly of, breaking the seal of, contaminating, etc.) the processing system 100 by an operator. Accordingly, in embodiments a sealed environment including an interior volume of a substrate carrier 114 and an internal volume of the EFEM 110 are maintained during determining error values and performing corrective actions (e.g., automatic teaching, calibrating and/or diagnostics operations).

The robot 118 is taught a fixed location relative to a load port, substrate carrier 114, load lock 119, SSP, aligner device, LCF device, etc. using an object, such as a pin (e.g., autoteach pin of the autoteach enclosure system) in embodiments. The fixed location in one embodiment corresponds to a center location of a substrate carrier 114 (e.g., autoteach enclosure system) placed at a particular load port, which in embodiments also corresponds to a center location of a different substrate carrier 114 (e.g., cassette of substrates) placed at the particular load port. Alternatively, the fixed location corresponds to other fixed locations within the processing system 100 (e.g., front or back of the substrate carrier 114, aligner device, load lock 119, LCF device, etc.). The robot 118 is calibrated using the object (e.g., autoteach pin and/or calibration substrate of the autoteach enclosure system) in some embodiments. The robot 118 is diagnosed using the object (e.g., calibration substrate of the autoteach enclosure system) in some embodiments.

In some embodiments, the robot 106 is substantially similar to the robot 118. In some embodiments, the robot 106 is a SCARA robot, but has fewer links and/or fewer degrees of freedom than the robot 118.

Content, such as substrates 105, are received into the transfer chamber 102 from the EFEM 110 and also exit the transfer chamber 102, to the EFEM 110, through the load lock chambers 109 that are coupled to a surface (e.g., a rear wall) of the EFEM 110. The load lock chambers 109 include one or more load locks (e.g., load locks 119A, 119B, for example). In some embodiments, load locks 119A, 119B that are included in the load lock chambers 109 are single wafer load lock (SWLL) chambers, multi-wafer chambers, or combinations thereof, for example. Each of the substrate carriers 114 are located on a load port. In some embodiments, the load ports are directly mounted to (e.g., sealed against) the EFEM 110. Substrate carriers 114 (e.g., cassette, FOUP, process kit enclosure system, autoteach enclosure system, enclosure system, or the like) are configured to removably couple (e.g., dock) to the load ports. In some embodiments, one or more substrate carriers 114 are coupled to the load ports for transferring wafers and/or other substrates into and out of the processing system 100. Each of the substrate carriers 114 seal against a respective load port. In some embodiments, a first substrate carrier 114 is docked to a first load port (e.g., for teaching, calibrating and/or diagnosing a robot 118 of the EFEM 110). Once such operation or operations are performed, the first substrate carrier 114 is then undocked from the load port, and then a second substrate carrier 114 (e.g., a FOUP containing wafers) is docked to the same load port. In some embodiments, a substrate carrier 114 is an autoteach enclosure system for performing one or more of an autoteach operation, a calibration operation, or a diagnostic operation. In some embodiments, a substrate carrier 114 is a process kit enclosure system for transferring content, such as process kit rings, into and out of the processing system 100.

In some embodiments, a load port includes a front interface that forms a vertical opening (or a substantially vertical opening). The load port additionally includes a horizontal surface for supporting a substrate carrier 114 (e.g., cassette, enclosure system, autoteach enclosure system). Each substrate carrier 114 (e.g., FOUP of wafers, autoteach enclosure system, process kit enclosure system) has a front interface that forms a vertical opening. The front interface of the substrate carrier 114 is sized to interface with (e.g., seal to) the front interface of the load port (e.g., the vertical opening of the substrate carrier 114 is approximately the same size as the vertical opening of the load port). The substrate carrier 114 is placed on the horizontal surface of the load port and the vertical opening of the substrate carrier 114 aligns with the vertical opening of the load port. The front interface of the substrate carrier 114 interconnects with (e.g., is clamped to, is secured to, is sealed to) the front interface of the load port. A bottom plate (e.g., base plate) of the substrate carrier 114 has features (e.g., load features, such as recesses or receptacles, that engage with load port kinematic pin features, a load port feature for pin clearance, and/or an enclosure system docking tray latch clamping feature) that engage with the horizontal surface of the load port. The same load ports are used for different types of substrate carriers 114 (e.g., autoteach enclosure system, process kit enclosure system, cassettes that contain wafers, etc.).

In some embodiments, substrate carrier 114 (e.g., autoteach enclosure system) includes an autoteach pin for performing an autoteach operation. In some embodiments, the substrate carrier 114 includes a calibration substrate (e.g., including a calibration pin) for performing one or more of a calibration operation or a diagnostic operation. Accordingly, in some embodiments, the substrate carrier 114 includes both an autoteach pin and a calibration substrate.

In some embodiments, one or more of a substrate carrier 114, SSP, aligner device, LCF device, load lock 119, and/or load port has a corresponding fixed location (e.g., pin, cylindrical pin, cylindrical pin with trapezoidal base, or the like) that is used to determine error values for one or more components of the processing system 100.

In some embodiments, the substrate carrier 114 (e.g., process kit enclosure system) includes one or more items of content (e.g., one or more of a process kit ring, an empty process kit ring carrier, a process kit ring disposed on a process kit ring carrier, a placement validation wafer, etc.). In some examples, the substrate carrier 114 is coupled to the EFEM 110 (e.g., via load port) to enable automated transfer of a process kit ring on a process kit ring carrier into the processing system 100 for replacement of a used process kit ring.

In some embodiments, the processing system 100 also includes first vacuum ports (e.g., slit valve assemblies 107 between the load locks 119 and the EFEM 110) coupling the EFEM 110 to respective load locks 119 (e.g., degassing chambers). Second vacuum ports (e.g., slit valve assemblies 107 between the load locks 119 and the transfer chamber 102) are coupled to respective load locks 119 (e.g., degassing chambers) and are disposed between the load locks 119 and transfer chamber 102 to facilitate transfer of substrates 105 and content (e.g., process kit rings) into the transfer chamber 102. In some embodiments, processing system 100 includes and/or uses one or more load locks 119 and a corresponding number of vacuum ports (e.g., slit valve assemblies 107) (e.g., a processing system 100 includes a single load lock 119, a single first slit valve assembly 107, and a single second slit valve assembly 107). The transfer chamber 102 includes process chambers 104 (e.g., four process chambers 104, six process chambers 104, etc.) disposed therearound and coupled thereto. The process chambers 104 are coupled to the transfer chamber 102 through respective ports 107, such as slit valves or the like. In some embodiments, the EFEM 110 is at a higher pressure (e.g., atmospheric pressure) and the transfer chamber 102 is at a lower pressure (e.g., vacuum). Each load lock 119 (e.g., degassing chamber, pressure chamber) has a first door (e.g., first slit valve assembly 107) to seal the load lock 119 from the EFEM 110 and a second door (e.g., second slit valve assembly 107) to seal the load lock 119 from the transfer chamber 102. Content is to be transferred from the EFEM 110 into a load lock 119 while the first door is open and the second door is closed, the first door is to close, the pressure in the load lock 119 is to be reduced to match the transfer chamber 102, the second door is to open, and the content is to be transferred out of the load lock 119. An LCF device is to be used to align the content in the transfer chamber 102 (e.g., before entering a process chamber 104, after leaving the process chamber 104).

A controller 120 controls various aspects of the processing system 100. The controller 120 is and/or includes a computing device such as a personal computer, a server computer, a programmable logic controller (PLC), a microcontroller, and so on. The controller 120 includes one or more processing devices, which, in some embodiments, are general-purpose processing devices such as a microprocessor, central processing unit, or the like. More particularly, in some embodiments, the processing device is a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device is one or more special-purpose processing devices such as an application specific integrated circuit (ASIC), a field programmable gate array (FPGA), a digital signal processor (DSP), network processor, or the like. In some embodiments, the controller 120 includes a data storage device (e.g., one or more disk drives and/or solid state drives), a main memory, a static memory, a network interface, and/or other components. In some embodiments, the controller 120 executes instructions to perform any one or more of the methods or processes described herein. The instructions are stored on a computer readable storage medium, which include one or more of the main memory, static memory, secondary storage and/or processing device (during execution of the instructions). The controller 120 receives signals from and sends controls to robot 118 and robot 106 in some embodiments.

FIG. 1 schematically illustrates transfer of content (e.g., substrate 105, a process kit ring coupled to a process kit ring carrier) into a process chamber 104. According to one aspect of the disclosure, content is removed from a substrate carrier 114 via robot 118 located in the EFEM 110. The robot 118 transfers the content through one of the first slit valve assembly 107 and into a respective load lock 119A, 119B. A robot 106 located in the transfer chamber 102 removes the content from one of the load locks 119A, 119B through a second slit valve assembly 107. The robot 106 moves the content into the transfer chamber 102, where the content is transferred to a process chamber 104 though a respective slit valve assembly 107. While not shown for clarity in FIG. 1, transfer of the content includes one or more of transfer of a substrate 105, transfer of a process kit ring disposed on a process kit ring carrier, transfer of an empty process kit ring carrier, transfer of a placement validation wafer, transfer of an imaging device on a wafer, etc.

FIG. 1 illustrates one example of transfer of content, however, other examples are also contemplated. In some examples, it is contemplated that the substrate carrier 114 is coupled to the transfer chamber 102 (e.g., via a load port mounted to the transfer chamber 102). From the transfer chamber 102, the content is to be loaded into a process chamber 104 by the robot 106. Additionally, in some embodiments, content is loaded in a SSP. In some embodiments, an additional SSP is positioned in communication with the EFEM 110 opposite the illustrated SSP. Processed content (e.g., a used process kit ring) is to be removed from the processing system 100 in reverse of any manner described herein. When utilizing multiple substrate carriers 114 or a combination of substrate carrier 114 and SSP, in some embodiments, one SSP or substrate carrier 114 is to be used for unprocessed content (e.g., new process kit rings), while another SSP or substrate carrier 114 is to be used for receiving processed content (e.g., used process kit rings). The substrate carrier 114 is used to perform one or more of an autoteach operation, calibration operation, or diagnostic operation of a robot arm (e.g., robot 118, robot 106, etc.) prior to transfer of content via the robot arm. The one or more of the autoteach, calibration, or diagnostic operation enable the robot arm to correctly remove objects from specific locations and correctly place objects in specific locations (e.g., upon docking the second substrate carrier 114 to the same load port to which the first substrate carrier 114 was docked).

The processing system 100 includes chambers, such as EFEM 110 and adjacent chambers (e.g., load port, substrate carrier 114, SSP, load lock 119, and/or the like) that are adjacent to the EFEM 110. One or more of the chambers is sealed (e.g., each of the chambers is sealed). The adjacent chambers are sealed to the EFEM 110. In some embodiments, inert gas (e.g., one or more of nitrogen, argon, neon, helium, krypton, or xenon) is provided into one or more of the chambers (e.g., the EFEM 110 and/or adjacent chambers) to provide one or more inert environments. In some examples, the EFEM 110 is an inert EFEM that maintains the inert environment (e.g., inert EFEM minienvironment) within the EFEM 110 so that users do not need to enter the EFEM 110 (e.g., the processing system 100 is configured for no manual access within the EFEM 110).

In some embodiments, gas flow (e.g., inert gas, nitrogen) is provided into one or more chambers (e.g., EFEM 110) of the processing system 100. In some embodiments, the gas flow is greater than leakage through the one or more chambers to maintain a positive pressure within the one or more chambers. In some embodiments, the inert gas within the EFEM 110 is recirculated. In some embodiments, a portion of the inert gas is exhausted. In some embodiments, the gas flow of non-recirculated gas into the EFEM 110 is greater than the exhausted gas flow and the gas leakage to maintain a positive pressure of inert gas within the EFEM 110. In some embodiments, the EFEM 110 is coupled to one or more valves and/or pumps to provide the gas flow into and out of the EFEM 110. A processing device (e.g., of controller 120) controls the gas flow into and out of the EFEM 110. In some embodiments, the processing device receives sensor data from one or more sensors (e.g., oxygen sensor, moisture sensor, motion sensor, door actuation sensor, temperature sensor, pressure sensor, etc.) and determines, based on the sensor data, the flow rate of inert gas flowing into and/or out of the EFEM 110.

One or more objects (e.g., pins) within the processing system 100 allow for determining error values and performing corrective actions (e.g., teaching, calibrating, and/or diagnosing) of one or more components of the processing system 100 (e.g., robot, aligner device, LCF device, etc.) without opening the sealed environment within the EFEM 110 and adjacent chambers. The substrate carrier 114 seals to the load port responsive to being docked on the load port. The substrate carrier 114 provides purge port access so that the interior of the substrate carrier 114 can be purged prior to opening the substrate carrier 114 to minimize disturbance of the inert environment within the EFEM 110.

In some embodiments, each load port and/or substrate carrier 114 has a corresponding pin (e.g., configured for a single pin scan on FOUP fixture) corresponding to a fixed location. In some embodiments, each SSP has a corresponding pin (e.g., configured for a single pin scan on SSP pin)

corresponding to a fixed location. In some embodiments, aligner device (e.g., in the EFEM 110) has a corresponding pin (e.g., configured for a single pin scan on aligner chuck) corresponding to a fixed location. In some embodiments, each buffer chamber has a corresponding pin (e.g., configured for a single pin scan on buffer pin) corresponding to a fixed location. In some embodiments, each load lock 119 has a corresponding pin (e.g., configured for an offset pin scan on all load locks 119) corresponding to a fixed location.

Figure 2A:
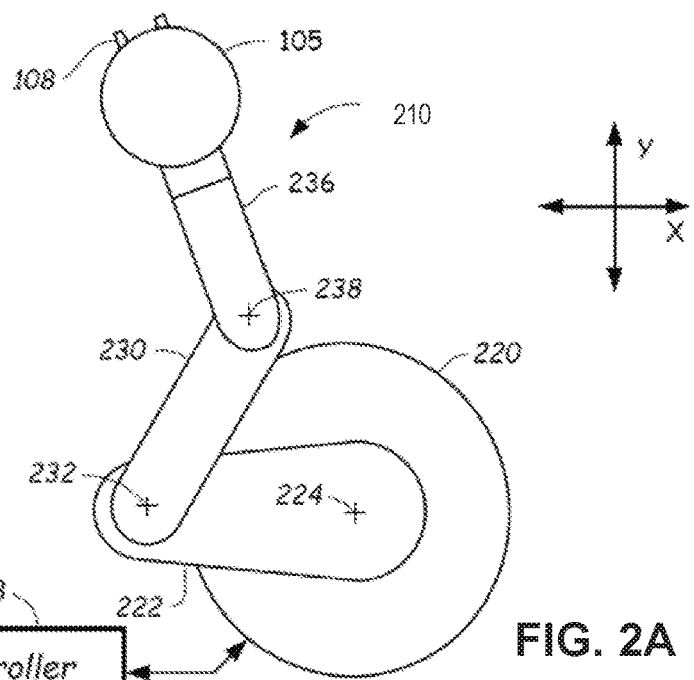
FIG. 2A illustrates a top plan view of a robot, according to certain embodiments.
Figure 2B:
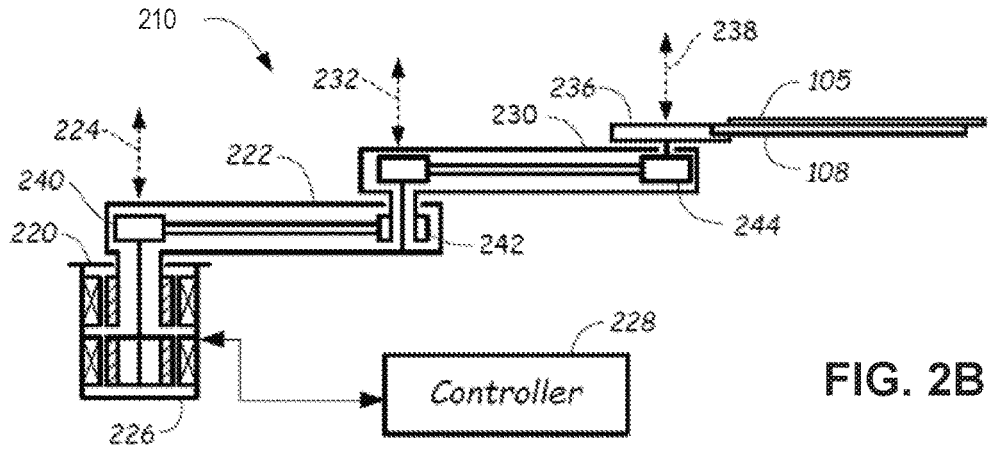
FIG. 2B illustrates a cross-sectioned side view of a robot, according to certain embodiments.

Reference is made to FIG. 2A, which illustrates a top plan view of a robot 210 (e.g., robot 106 and/or robot 118 of FIG. 1), according to certain embodiments. Reference is also made to FIG. 2B, which illustrates a cross-sectioned side view of a robot 210 (e.g., robot 106 and/or robot 118 of FIG. 1), according to certain embodiments. In some embodiments, the robot 210 includes a base 220 adapted to be attached to a wall of the processing system (e.g., processing system 100 of FIG. 1, the transfer chamber 102 of FIG. 1, EFEM 110 of FIG. 1, etc.). In some embodiments, the robot 210 also includes an upper arm 222, which, in the depicted embodiments, is a substantially rigid cantilever beam. The upper arm 222 is adapted to be rotated about a first rotational axis 224 in clockwise and counterclockwise rotational directions. The rotation about first rotational axis 224 is provided by any suitable motor, such as a variable reluctance or permanent magnet electric motor. The motor is received in a motor housing 226. The rotation of the upper arm 222 is controlled by suitable commands to the motor from a controller 228 (e.g., controller 120 of FIG. 1).

A forearm 230 is coupled to the upper arm 222 at a second rotational axis 232. The second rotational axis 232 is spaced from the first rotational axis 224. The forearm 230 is adapted for rotation in the X-Y plane relative to the upper arm 222 about the second rotational axis 232. A wrist member 236 is coupled to the forearm 230 at a third rotational axis 238. The wrist member 236 is adapted for rotation in the X-Y plane about the third rotational axis 238. The end effector 108 is coupled to the wrist member 236 and is adapted to carry and transport a substrates 105.

FIG. 2B illustrates a cross-sectioned side view of robot 210, according to certain embodiments. The robot 210 includes a plurality of joints (e.g., rotary joints) between the links or arms of the robot 210. The joints enable the arms to rotate relative to on another. Play within the joints causes inaccuracies in determining the actual position of the end effector 108 and content (e.g., substrate 105 of FIG. 1) located thereon.

The robot 210 depicted in FIGS. 2A-B includes three joints. A first joint 240 is located between the motor housing 226 and the upper arm 222. The first joint 240 enables the upper arm 222 to rotate relative to the motor housing 226 about the first rotational axis 224. A second joint 242 is located between the upper arm 222 and the forearm 230. The second joint 242 enables the forearm 230 to rotate relative to the upper arm 222 about the second rotational axis 232. A third joint 244 is located between the forearm 230 and the wrist member 236. The third joint enables the wrist member 236 to rotate relative to the forearm 230 about the third rotational axis 238.

In some embodiments, robot 210 of FIGS. 2A-B is positioned in different postures in a substrate processing system relative to a fixed location in the substrate processing system. Sensor data is generated that identifies the fixed location relative to the robot in the different postures. Based on the sensor data, error values are determined corresponding to one or more components of the substrate processing system and, based on the error values, performance of one or more corrective actions associated with the one or more components are caused. In some embodiments, the error values and the corrective actions correspond to joint rotation about one or more of first joint 240, second joint 242, and/or third joint 244. In some embodiments, the controller 228 (e.g., controller 120 of FIG. 1) determines each error value for each component separately (e.g., by isolating movement of each component).

Figure 3A:
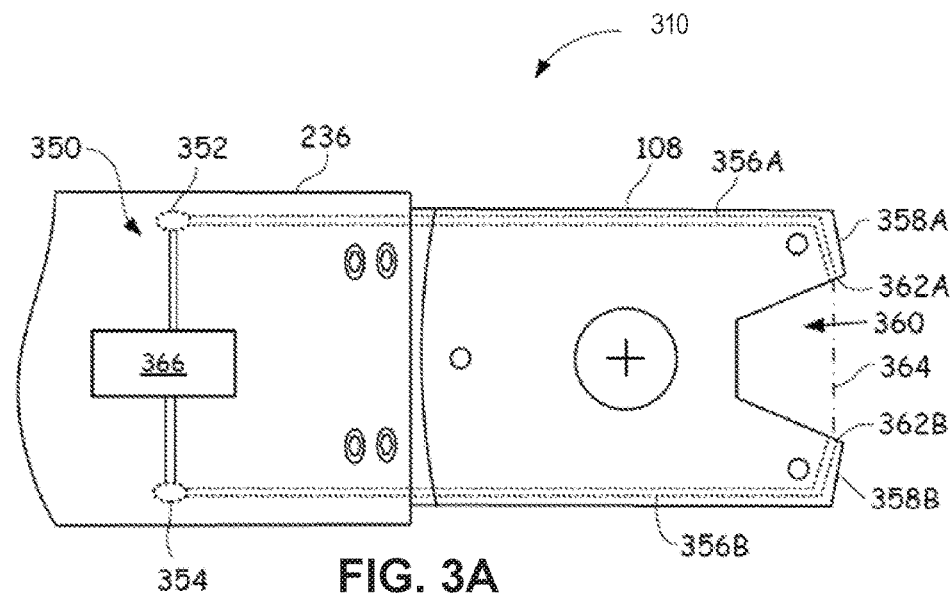

FIG. 3A is a top view of an embodiment of the wrist member 236 and the end effector 108 of the robot 310 (e.g., robot 210 of FIGS. 2A-B, robot 106 and/or robot 118 of FIG. 1, etc.). The end effector 108 and/or the wrist member 236 includes a beam sensor 350, which, in some embodiments, includes a light source 352 and a light receiver 354. A light transmitting fiber 356A is coupled to the light source 352. The light transmitting fiber 356A is routed through the wrist member 236 and the end effector 108 and terminates at a first end 358A of the end effector 108. A light receiving fiber 356B is coupled to the light receiver 354. The light receiving fiber 356B is routed through the wrist member 236 and the end effector 108 and terminates at a second end 358B of the end effector 108. The first end 358A and the second end 358B of the end effector 108 are spaced apart across a gap 360 that forms a relief region for certain types of processing including detecting a peripheral edge of a substrate 105 (see FIG. 1), other content, and/or an object (e.g., a pin).

The light transmitting fiber 356A terminates at a first light path opening 362A proximate the first end 358A. Similarly, the light receiving fiber 356B terminates at a second light path opening 362B proximate the second end 358B. The first light path opening 362A and the second light path opening 362B face each other and form a light transmission path 364 (e.g., a light beam) for detecting the presence or absence of a peripheral edge of a substrate 105 (see FIG. 1), other content, and/or an object (e.g., pin). The light transmission path 364 extends between the first end 358A and the second end 358B (i.e., between two points), which enables detection of objects in the gap 360.

The beam sensor 350 further includes a light transmitting/receiving module 366 that detects degrees of light transmission between the light transmitting fiber 356A and the light receiving fiber 356B. The light transmitting/receiving module 366 senses a peripheral edge of a substrate 105 (FIG. 1) or other object located between the first light path opening 362A and the second light path opening 362B when the substrate 105 or other object blocks the light transmission path 364. An output signal generated by the light transmitting/receiving module 366 is provided to the controller (e.g., controller 228 of FIGS. 2A-B, controller 120 of FIG. 1) via conductors (not shown) passing through the robot 310.

During operation of the robot 310, the controller (e.g., controller 228 of FIGS. 2A-B, controller 120 of FIG. 1) transmits signals to the robot 310 that cause the end effector 108 to move to certain locations. For example, the controller 228 generates signals causing the upper arm 222, the forearm 230, and the wrist member 236 to move to specific locations, such as locations within the processing system (e.g., processing chamber 104, transfer chamber 102, or EFEM 110 of FIG. 1). The controller generates signals to move the end effector 108 based on a fixed location relative to the robot 310. For example, the robot 310 is used to determine error values and perform corrective actions (e.g., an auto teach function, a calibration function, a diagnosis function, etc.), where the robot 310 is used to determines sensor data (e.g., coordinate data points, images, etc.) corresponding to the fixed location. The controller then generates signals to move upper arm 222, the forearm 230, and the wrist member 236 to move the end effector 108 to specific locations that are relative to the fixed location.

Some errors in the robot mechanics cause errors in positioning the end effector 108. In some examples, the joints 240, 242, 244 have errors or play, which contribute to position errors. These position errors reduce the accuracy of the auto teach, calibration, and/or diagnosis performed by the robot 310. The errors in the joints 240, 242, 244 include joint kinematic errors, joint hysteresis, and joint backlash. The joint kinematic error are sometimes referred to as joint errors and are the result of joints not rotating as they are instructed (e.g., requesting the same point from different postures shows kinematic error). For example, a joint is instructed to rotate to a specific angle, but the joint rotates to a different angle (e.g., difference across plot of lateral (Tx) plotted against axial (Ty) is joint error). Joint backlash occurs when a joint is rotated clockwise or counterclockwise and a repeatable difference in position occurs (e.g., difference from forward drive and backward drive is backlash). Joint hysteresis relates to hysteresis observed in clockwise and counterclockwise rotation of the joints. Transmission error relates to gear and pulley reductions (e.g., at a joint angle) that are different from what is published (e.g., 35:1.0002 actual reduction instead of published 35:1 reduction). Other errors (e.g., link length error) that are analyzed include the actual lengths of the upper arm 222, the forearm 230, and the wrist member 236 versus their lengths that are stored by the controller (e.g., variation of up to 360.13 mm length instead of stock length of 360 mm). SetZero offset error relates to pinning the robot to set the zeroth position and the mechanical zeroth position is off by up to 0.1 to 0.2 degrees in some examples.

The auto teach, calibration, diagnosis, etc. accuracy is improved by repeatedly orienting the end effector 108 to a fixed location using different robot postures. In some embodiments, a robot posture refers to the positions of the upper arm 222, the forearm 230, and the wrist member 236. The robot 106 is used to determine sensor data (e.g., different coordinate data points, different images, etc.) of the fixed location, which vary due to the joint errors and other errors.

Accurate kinematics (e.g., adjusting due to determined error values) benefit straighter robot paths, better LCF device repeatability, accurate autoteach operations, enable the robot to make measurements, and the like.

FIG. 3B illustrates a top view of a robot 310, according to certain embodiments. The robot 310 is configured to be used to determine one or error values (e.g., perform one or more of an autoteach operation, a calibration operation, or a diagnostic operation) using an object, such as a pin. The robot 310 includes an end effector 108, a wrist member 236, a first light path opening 262A (e.g., fiber emitter) coupled to a light source 352, and a second light path opening 362B (e.g., fiber receiver) coupled to a light receiver 354. A light transmission path 364 (e.g., light beam, beam triggering path) is disposed between the first light path opening 362A and the second light path opening 362B.

The robot 310 has a robot wrist center 370 that corresponds to an actual wafer center 372. A characteristic error 374 (e.g., robot arm error) of the robot 310 is the distance or angle between a center line and an error line. The center line is between the robot wrist center 370 and actual wafer center 372 (e.g., vector wrist to wafer center). The error line (e.g., vector wrist to beam) is perpendicular (e.g., at a 90 degree angle 376) to the light transmission path 364 (e.g., beam triggering path). In some embodiments, the robot 310 determines the characteristic error 374 via a calibration operation.

FIG. 3C illustrates a top view of a robot 310 and an aligner device 380, according to certain embodiments. In some embodiments, error values of the aligner device 380 are determined (e.g., the aligner device 380 is calibrated) and then error values of the robot 310 are determined (e.g., the robot 310 is calibrated) using the aligner device 380. In some embodiments, error values of the robot 310 are determined (e.g., the robot 310 is calibrated) and then error values of the aligner device 380 are determined (e.g., the aligner device 380 is calibrated) using the aligner robot 310.

In some embodiments, the calibration wafer 384 has a notch and/or a pin. In some embodiments, the aligner device 380 uses the notch to align the calibration wafer 384 and the robot 310 detects the location of the pin of the calibration wafer 384.

Subsequent to determining the error values of (e.g., calibrating) the aligner device 380 or the robot 310, the robot 310 supporting a calibration wafer 384 (e.g., notched wafer with offset pin 386) is moved to the aligner device 380 to align the robot X-Y center 388 to the aligner device 380 (e.g., by scanning a portion of the aligner device 380). This matches the robot X-Y center to the aligner device true center X-Y (e.g., X-Y aligner device 380-robot 310 matching), however the relative angle of the robot 310 to the aligner device 380 is unknown. The robot 310 places the calibration wafer 384 on the aligner device 380. The aligner device 380 uses the notch of the calibration wafer 384 to determine the position (e.g., rotation, yaw) of the calibration wafer 384 (e.g., by rotating the calibration wafer 384). The aligner device 380 rotates the calibration wafer 384 left and right to trigger the mapping fiber (e.g., light transmission path 364, a repeatable trigger line) on the robot 310 to determine the midpoint angle reference. The wrist of the robot 310 is rotated left and right to trigger the mapping fiber on the robot 310 to determine the midpoint of the robot 310. In some embodiments, the procedure is repeated for multiple access angles (e.g., realigning X-Y between iterations). This provides a plot of commanded position vs. aligner device-measured positions. In some embodiments, the data is fitted and regression is performed to find linear slope.

The difference between the midpoint reference (e.g., coordinate data point) determined by the aligner device 380 and the midpoint (e.g., coordinate data point) determined by the robot 310 is the relative difference (e.g., blade setzero, difference between scanned midpoints for pin is the zero offset for the indicated axis). Responsive to previously determining the error values of (e.g., calibrating) the aligner device 380, the relative difference is the error value of the robot 310 (e.g., used to calibrate the robot 310). Responsive to previously determining the error values of (e.g., calibrating) the robot 310, the relative difference is the error value of the aligner device 380 (e.g., used to calibrate the aligner device 380).

Although FIG. 3C refers to a robot 310 and an aligner device 380, other components could be used, such as robot 310 and the LCF device, etc.

Reference is made to FIG. 4, which illustrates a top plan view of an end effector 108 detecting a pin 468 (e.g., fixed location), according to certain embodiments. Based on a known diameter of the pin 468, the location of the center 470 of the pin 468 is determined. As the end effector 108 approaches the pin 468, the periphery of the pin 468 breaks the light transmission path 364. At this time, the angles of the joints 240, 242, 244 are recorded by the controller 228. The process is repeated a plurality of times using different robot postures as shown by the dashed end effector 108.

In some embodiments, the controller checks that the pin 468 is centered midway between the first end 358A and the second end 358B of the end effector 108. In some embodiments, the centering is achieved by rotating the end effector 108 back and forth via a single joint (e.g., an isolated joint, the third joint 244) as the end effector 108 is slightly moved parallel to a tangent of the pin 468. The end effector 108 is also moved away and toward the pin 468. The shortest measured distance to the pin 468 constitutes the midway point between the first end 358A and the second end 358B of the end effector 108. This position is also the midway point in the gap 360 between the first end 358A and the second end 358B.

The process to measure joint error so as to account for joint error commences with moving the end effector 108 to a known and/or fixed position, such as the pin 468. The end effector 108 then measures the location of the pin 468 from several different points using different postures of the robot 106. In some embodiments, the same position on the pin 468 is measured using different postures.

Additional reference is now made to FIG. 5, which illustrates a plan view of the end effector 108 with a beam sensor in several positions detecting a pin 468, according to certain embodiments. In some embodiments, the end effector 108 is used to measure the position of the pin 468 as the end effector 108 moves in a yaw direction 574 around the pin 468.

Under ideal conditions, without any joint or other errors, the robot 106 should measure the same location of center 470 of the pin 468 regardless of the posture of the robot (e.g., robot 106 of FIG. 1, robot 118 of FIG. 1, robot 210 of FIG. 2, robot 310 of FIG. 3).

Figure 6:
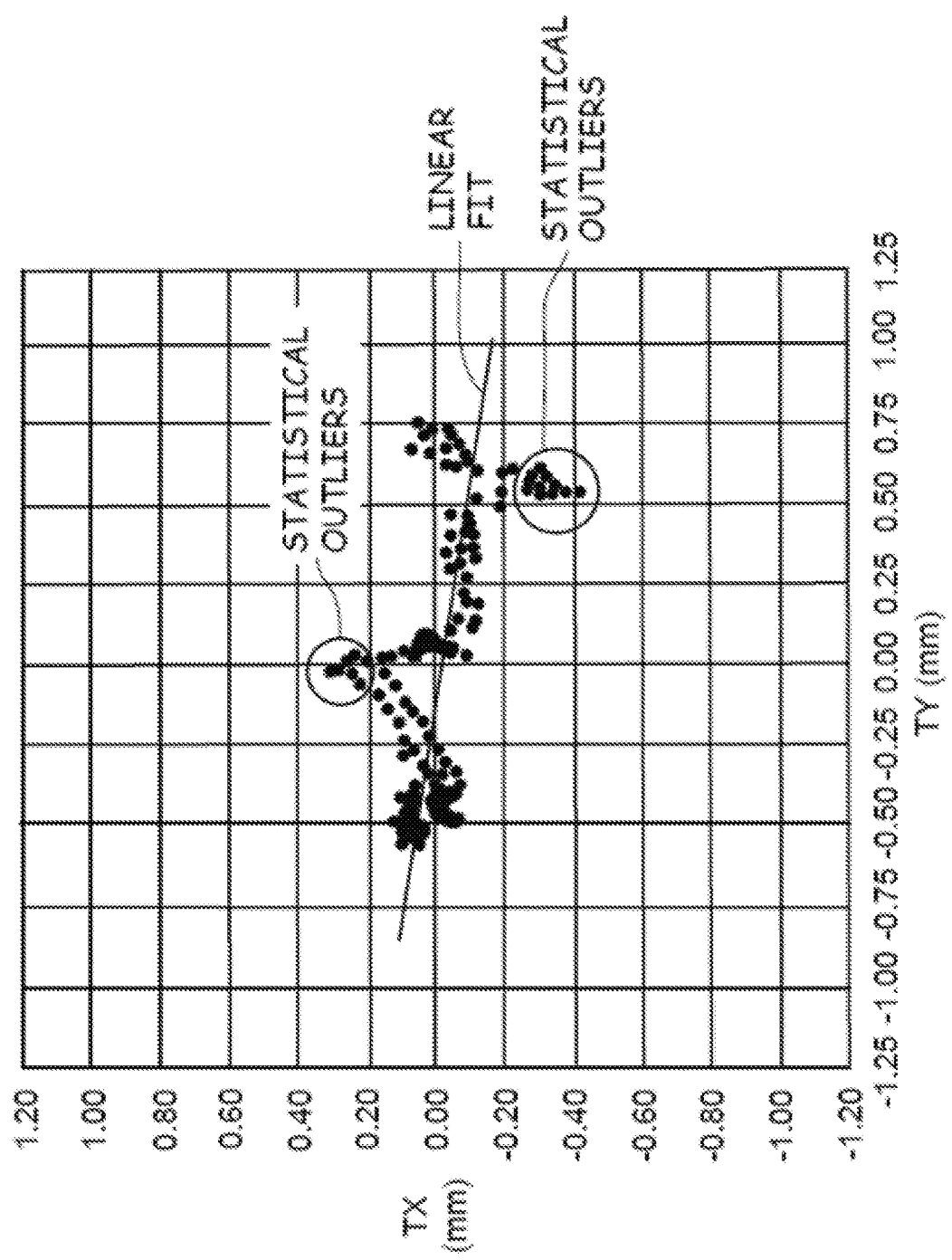
FIG. 6 illustrates a graph showing coordinate data points where a robot measured a fixed location, according to certain embodiments.

Additional reference is made to FIG. 6, which is a graph illustrating example coordinate data points where a robot (e.g., robot 106 of FIG. 1, robot 118 of FIG. 1, robot 210 of FIG. 2, robot 310 of FIG. 3, etc.) measured a fixed location (e.g., pin 468 of FIGS. 4-5), according to certain embodiments. In FIG. 6, the actual position of the pin 468 is at coordinate data points (0.0, 0.0). As shown in FIG. 6, the robot rarely locates the actual position of the pin 468. Should the auto teach process rely on the measurements shown in FIG. 6 or similar measurements, the robot will not accurately position the end effector 108.

In order to improve the auto teach, calibration, diagnosis, etc., the joint errors are factored out. The coordinate data points of the know reference (e.g., the pin 468) are recorded by the processing device, controller, or other device. In some embodiments, a linear fit is made to the coordinate data points based on values derived from pre-calibrated data taken during calibration step (calibration operation, set zero-ing). An example of a linear fit is shown by a line in FIG. 6. In some embodiments, at least one of the mean, mode, and standard deviation where the measurements indicated the center 470 is determined. Coordinates constituting extremes and statistical outliers based on at least one of mean, mode, and standard deviation are discarded. Examples of statistical outliers are shown in FIG. 6. The remaining coordinate data points are then re-averaged via applying a second linear fit without the discarded outliers. The data of the second linear fit is then used to perform more accurate positioning during auto teach procedures. In some embodiments, a substrate 105 is placed on the end effector 108 and the above-described process is performed based on the edge of the substrate moving around a known and/or fixed location.

Figure 7:
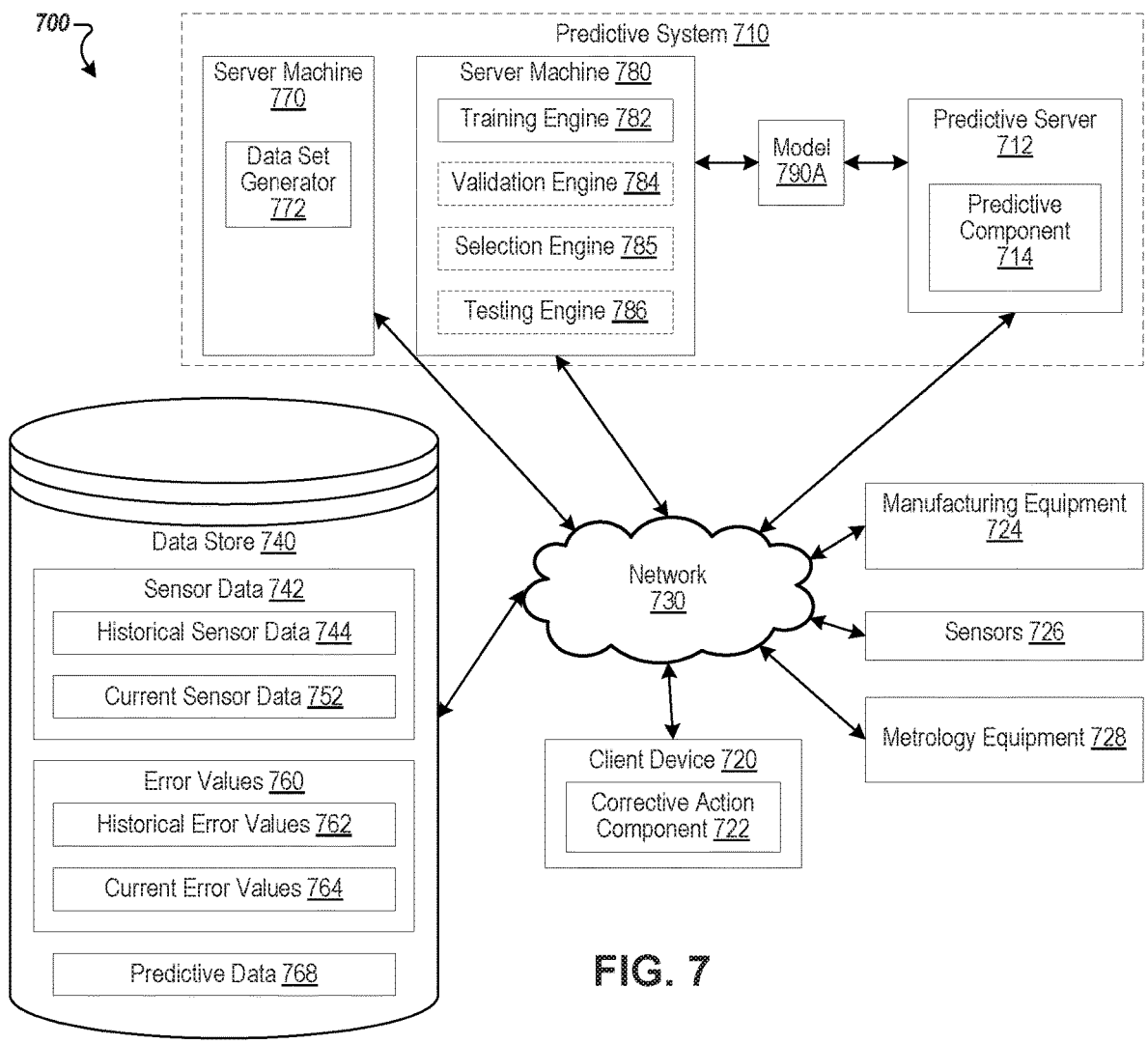
FIG. 7 is a block diagram illustrating an exemplary system architecture, according to certain embodiments.

FIG. 7 is a block diagram illustrating an exemplary system 700 (exemplary system architecture), according to certain embodiments. The system 700 includes a client device 720, manufacturing equipment 724 (e.g., processing system 100 of FIG. 1), sensors 726, metrology equipment 728, a predictive server 712, and a data store 740. The predictive server 712 is part of a predictive system 710. The predictive system 710 further includes server machines 770 and 780.

The sensors 726 provide sensor data 742 (e.g., coordinate data points identifying a fixed location, images of the fixed location, etc.) associated with manufacturing equipment 724 (e.g., associated with moving robots). The sensor data 742 is used to determine error values for performing corrective actions (e.g., calibration, auto teach, diagnosis, etc.). The manufacturing equipment 724 is used to produce products following a recipe or performing runs over a period of time. In some embodiments, the sensor data 742 is received prior to or after the production of products. In some embodiments, at least a portion of the sensor data 742 is received over a period of time (e.g., corresponding to at least part of a recipe or run) from different sensors 726.

The sensors 726 provide sensor data 742 relative to the manufacturing equipment 724 and one or more fixed locations. In some embodiments, the sensors 726 include a light source and light receiver of a robot (e.g., within the end effector of the robot) that are used to determine a fixed location relative to the robot. In some embodiments, the sensors 726 include an imaging device configured to determine a fixed location relative to the robot. In some examples, the imaging device is attached to the robot (e.g., attached to the wrist member) or is disposed on the robot (e.g., an imaging substrate, an imaging device on a wafer, etc.).

In some embodiments, the sensor data 742 (e.g., historical sensor data 744, current sensor data 752, etc.) is processed (e.g., by the client device 720 and/or by the predictive server 712). Processing of the sensor data 742 includes one or more of removing outliers, fitting the sensor data 742, performing regression, finding a linear slope, and/or the like.

The error values 760 include data associated with one or more components of the manufacturing equipment 724. In some examples, the error values 760 include a rotational error of a joint, a length error of a link of the robot, and/or the like. In some embodiments, the error values 760 are used for supervised machine learning.

Error values 760 include an indication of variance in components (e.g., of the same type, of the same part number) of manufacturing equipment. In some embodiments, determining a variance in components is used for chamber matching for product-to-product uniformity. In some examples, an error in rotation of a joint of a robot causes misplacement of content which causes damage to the content, the robot, and/or the processing system. In some examples, the error values 760 contribute to product-to-product variation. Causing of a corrective action based on the error values 760 improves the quality of products, decreases damage to the manufacturing equipment 724, decreases damage to the processing system, and/or the like.

In some embodiments, the predictive system 710 generates predictive data 768 using supervised machine learning (e.g., supervised data set, error values 760 including measured data, etc.). In some embodiments, the predictive system 710 generates predictive data 768 using semi-supervised learning (e.g., semi-supervised data set, error values 760 are a predictive percentage, etc.). In some embodiments, the predictive system 710 generates predictive data 768 using unsupervised machine learning (e.g., unsupervised data set, clustering, clustering based on error values 760, etc.).

The client device 720, manufacturing equipment 724, sensors 726, metrology equipment 728, predictive server 712, data store 740, server machine 770, and server machine 780 are coupled to each other via a network 730 for generating predictive data 768 to perform corrective actions.

In some embodiments, network 730 is a public network that provides client device 720 with access to the predictive server 712, data store 740, and other publically available computing devices. In some embodiments, network 730 is a private network that provides client device 720 access to manufacturing equipment 724, sensors 726, metrology equipment 728, data store 740, and other privately available computing devices. Network 730 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 720 includes a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. The client device 720 includes a corrective action component 722. Corrective action component 722 receives user input (e.g., via a Graphical User Interface (GUI) displayed via the client device 720) of an indication associated with manufacturing equipment 724. In some embodiments, the corrective action component 722 transmits the indication to the predictive system 710, receives output (e.g., predictive data 768) from the predictive system 710, determines a corrective action based on the output, and causes the corrective action to be implemented. In some embodiments, the corrective action component 722 obtains sensor data 742 (e.g., current sensor data 752) associated with the manufacturing equipment 724 (e.g., from data store 740, etc.) and provides the sensor data 742 (e.g., current sensor data 752) associated with the manufacturing equipment 724 to the predictive system 710. In some embodiments, the corrective action component 722 stores sensor data 742 in the data store 740 and the predictive server 712 retrieves the sensor data 742 from the data store 740. In some embodiments, the predictive server 712 stores output (e.g., predictive data 768) of the trained machine learning model(s) 790 in the data store 740 and the client device 720 retrieves the output from the data store 740. In some embodiments, the corrective action component 722 receives an indication of a corrective action from the predictive system 710 and causes the corrective action to be implemented. Each client device 720 includes an operating system that allows users to one or more of generate, view, or edit data (e.g., indication associated with manufacturing equipment 724, corrective actions associated with manufacturing equipment 724, etc.).

In some embodiments, the historical error values 762 include one or more of center values of at least a portion of the historical sensor data 744, convergence of standard deviation of at least a portion of the historical sensor data 744, LCF sensor data from an LCF device, aligner sensor data from an aligner sensor device, third party sensor data from one or more third party sensors, and/or the like. In some embodiments, the predictive data 768 corresponds to a predicted error values (e.g., predicted rotation error, predicted length error, etc.). In some embodiments, the predictive data 768 is an indication of abnormalities (e.g., abnormal components, abnormal manufacturing equipment 724, etc.). In some embodiments, the predictive data 768 is an indication of an end of life of a component of manufacturing equipment 724.

Performing metrology can be costly in terms of time used, metrology equipment 728 used, energy consumed, bandwidth used to send the metrology data, processor overhead to process the metrology data, etc. By inputting sensor data 742 (e.g., coordinate data points, images, current sensor data 752, etc.) and receiving output of predictive data 768, system 700 can have the technical advantage of avoiding the costly process of using metrology equipment 728 to generate current error values 764 for current sensor data 752.

Performing manufacturing processes that result in defective products can be costly in time, energy, products, components, manufacturing equipment 724, the cost of identifying the defects and discarding the defective product, etc. By inputting sensor data 742 (e.g., coordinate data points, images, current sensor data 752, etc.), receiving output of predictive data 768, and performing a corrective action based on the predictive data 768, system 700 can have the technical advantage of avoiding the cost of producing, identifying, and discarding defective products.

Performing manufacturing processes that result in failure of the components of the manufacturing equipment 724 can be costly in downtime, damage to products, damage to equipment, express ordering replacement components, etc. By inputting sensor data 742 (e.g., coordinate data points, images, current sensor data 752, etc.), receiving output of predictive data 768, and performing corrective action (e.g., predicted operational maintenance, such as replacement, processing, cleaning, etc. of components) based on the predictive data 768, system 700 can have the technical advantage of avoiding the cost of one or more of unexpected component failure, unscheduled downtime, productivity loss, unexpected equipment failure, product scrap, or the like.

Corrective action are associated with one or more of calibration, auto teach, diagnosis, Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, feedback control, machine learning modification, or the like.

In some embodiments, the corrective action includes providing an alert (e.g., an alarm to stop or not perform the manufacturing process if the predictive data 768 indicates a predicted abnormality (e.g., difference between directed position of a robot and the actual location of the robot). In some embodiments, the corrective action includes providing feedback control (e.g., modifying a position of a robot, aligner device, and/or LCF device responsive to the predictive data 768 indicating a predicted abnormality). In some embodiments, the corrective action includes providing machine learning (e.g., modifying one or more positions based on the predictive data 768).

The predictive server 712, server machine 770, and server machine 780 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 712 includes a predictive component 714. In some embodiments, the predictive component 714 receives current sensor data 752 (e.g., receive from the client device 720, retrieve from the data store 740) and generates output (e.g., predictive data 768) for performing corrective action associated with the manufacturing equipment 724 based on the current sensor data 752. In some embodiments, the predictive component 714 uses one or more trained machine learning models 790 to determine the output for performing the corrective action based on the current sensor data 752.

In some embodiments, the predictive component 714 receives current sensor data 752, provides the current sensor data 752 as input to a trained machine learning model 790, and obtains outputs indicative of predictive data 768 from the trained machine learning model 790.

Trained machine learning model 790 is trained using historical sensor data 744 and historical error values 762.

Data store 740 is a memory (e.g., random access memory), a drive (e.g., a hard drive, a flash drive), a database system, or another type of component or device capable of storing data. Data store 740 includes multiple storage components (e.g., multiple drives or multiple databases) that spans multiple computing devices (e.g., multiple server computers). The data store 740 stores sensor data 742, error values 760, and predictive data 768. Sensor data 742 includes historical sensor data 744 and current sensor data 752. Error values 760 include historical error values 762 and current error values 764. The historical sensor data 744 and historical error values 762 are historical data (e.g., at least a portion for training the machine learning model 790). The current sensor data 752 is current data (e.g., at least a portion to be input into the trained machine learning model 790, subsequent to the historical data) for which predictive data 768 is to be generated (e.g., for performing corrective actions). In some embodiments, the current error values 764 also are current data (e.g., for re-training the trained machine learning model).

In some embodiments, predictive system 710 further includes server machine 770 and server machine 780. Server machine 770 includes a data set generator 772 that is capable of generating data sets (e.g., a set of data inputs and a set of target outputs) to train, validate, and/or test a machine learning model(s) 790. Some operations of data set generator 772 are described in detail below with respect to FIGS. 8 and 10A. In some embodiments, the data set generator 772 partitions the historical data (e.g., historical sensor data 744, historical error values 762) into a training set (e.g., sixty percent of the historical data), a validating set (e.g., twenty percent of the historical data), and a testing set (e.g., twenty percent of the historical data). In some embodiments, the predictive system 710 (e.g., via predictive component 714) generates multiple sets of features. For example a first set of features corresponds to a first set of types of sensor data (e.g., from a first set of sensors, first combination of values from first set of sensors, first patterns in the values from the first set of sensors) that correspond to each of the data sets (e.g., training set, validation set, and testing set) and a second set of features corresponds to a second set of types of sensor data (e.g., from a second set of sensors different from the first set of sensors, second combination of values different from the first combination, second patterns different from the first patterns) that correspond to each of the data sets.

Server machine 780 includes a training engine 782, a validation engine 784, selection engine 785, and/or a testing engine 786. An engine (e.g., training engine 782, a validation engine 784, selection engine 785, and a testing engine 786) refers to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 782 is capable of training a machine learning model 790 using one or more sets of features associated with the training set from data set generator 772. In some embodiments, the training engine 782 generates multiple trained machine learning models 790, where each trained machine learning model 790 corresponds to a distinct set of features of the training set (e.g., sensor data from a distinct set of sensors). For example, a first trained machine learning model is trained using all features (e.g., X1-X5), a second trained machine learning model is trained using a first subset of the features (e.g., X1, X2, X4), and a third trained machine learning model is trained using a second subset of the features (e.g., X1, X3, X4, and X5) that partially overlap the first subset of features.

The validation engine 784 is capable of validating a trained machine learning model 790 using a corresponding set of features of the validation set from data set generator 772. For example, a first trained machine learning model 790 that was trained using a first set of features of the training set is validated using the first set of features of the validation set. The validation engine 784 determines an accuracy of each of the trained machine learning models 790 based on the corresponding sets of features of the validation set. The validation engine 784 discards trained machine learning models 790 that have an accuracy that does not meet a threshold accuracy. In some embodiments, the selection engine 785 is capable of selecting one or more trained machine learning models 790 that have an accuracy that meets a threshold accuracy. In some embodiments, the selection engine 785 is capable of selecting the trained machine learning model 790 that has the highest accuracy of the trained machine learning models 790.

The testing engine 786 is capable of testing a trained machine learning model 790 using a corresponding set of features of a testing set from data set generator 772. For example, a first trained machine learning model 790 that was trained using a first set of features of the training set is tested using the first set of features of the testing set. The testing engine 786 determines a trained machine learning model 790 that has the highest accuracy of all of the trained machine learning models based on the testing sets.

The machine learning model 790 refers to the model artifact that is created by the training engine 782 using a training set that includes data inputs and corresponding target outputs (correct answers for respective training inputs). Patterns in the data sets can be found that map the data input to the target output (the correct answer), and the machine learning model 790 is provided mappings that captures these patterns. The machine learning model 790 uses one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network), etc.

Predictive component 714 provides current sensor data 752 to the trained machine learning model 790 and runs the trained machine learning model 790 on the input to obtain one or more outputs. The predictive component 714 is capable of determining (e.g., extracting) predictive data 768 from the output of the trained machine learning model 790 and determining (e.g., extract) confidence data from the output that indicates a level of confidence that the predictive data 768 corresponds to the current data (e.g., current error values 764) for manufacturing equipment 724 associated with the current sensor data 752. The predictive component 714 or corrective action component 722 uses the confidence data to decide whether to cause a corrective action associated with the manufacturing equipment 724 based on the predictive data 768.

In one example, the level of confidence is a real number between 0 and 1 inclusive, where 0 indicates no confidence that the predictive data 768 corresponds to current error values 764 associated with the current sensor data 752 and 1 indicates absolute confidence that the predictive data 768 corresponds to current error values 764 associated with the current sensor data 752. In some embodiments, the system 700 uses predictive system 710 to determine predictive data 768 instead of using the metrology equipment 728 to determine current error values 764. In some embodiments, responsive to the confidence data indicating a level of confidence that is below a threshold level, the system 700 causes the metrology equipment 728 to generate the current error values 764. Responsive to the confidence data indicating a level of confidence below a threshold level for a predetermined number of instances (e.g., percentage of instances, frequency of instances, total number of instances, etc.) the predictive component 714 causes the trained machine learning model 790 to be re-trained (e.g., based on the current sensor data 752 and current error values 764, etc.).

Figure 8:
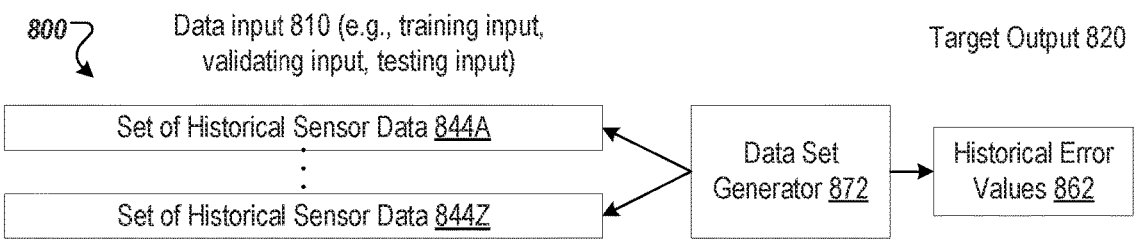
FIG. 8 is an example data set generator to create a data set for a machine learning models, according to certain embodiments.

For purpose of illustration, rather than limitation, aspects of the disclosure describe the training of one or more machine learning models 790 using historical data (e.g., historical sensor data 744, historical error values 762) and inputting current data (e.g., current sensor data 752) into the one or more trained machine learning models 790 to determine predictive data 768 (e.g., current error values 764). In other implementations, a heuristic model or rule-based model is used to determine predictive data 768 (e.g., without using a trained machine learning model). Predictive component 714 monitors historical sensor data 744 and historical error values 762. In some embodiments, any of the information described with respect to data inputs 810 of FIG. 8 is monitored or otherwise used in the heuristic or rule-based model.

In some embodiments, the functions of client device 720, predictive server 712, server machine 770, and server machine 780 are provided by a fewer number of machines. For example, in some embodiments, server machines 770 and 780 are integrated into a single machine, while in some other embodiments, server machine 770, server machine 780, and predictive server 712 are integrated into a single machine. In some embodiments, client device 720, and predictive server 712 are integrated into a single machine.

In general, functions described in one embodiment as being performed by client device 720, predictive server 712, server machine 770, and server machine 780 can also be performed on predictive server 712 in other embodiments, if appropriate. In addition, the functionality attributed to a particular component can be performed by different or multiple components operating together. For example, in some embodiments, the predictive server 712 determines the corrective action based on the predictive data 768. In another example, client device 720 determines the predictive data 768 based on output from the trained machine learning model.

In addition, the functions of a particular component can be performed by different or multiple components operating together. One or more of the predictive server 712, server machine 770, or server machine 780 is accessed as a service provided to other systems or devices through appropriate application programming interfaces (API).

In embodiments, a "user" is represented as a single individual. However, other embodiments of the disclosure encompass a "user" being an entity controlled by a plurality of users and/or an automated source. For example, a set of individual users federated as a group of administrators is considered a "user."

Although embodiments of the disclosure are discussed in terms of generating predictive data 768 to perform a corrective action in manufacturing facilities (e.g., semiconductor manufacturing facilities), embodiments also are generally applied to characterizing and monitoring components. Embodiments are generally applied to characterizing and monitoring based on different types of data.

FIG. 8 is an example data set generator 872 (e.g., data set generator 772 of FIG. 7) to create data sets for a machine learning model (e.g., model 790 of FIG. 7), according to certain embodiments. Each data set generator 872 are part of server machine 770 of FIG. 7.

Data set generator 872 creates data sets using historical sensor data 844 (e.g., historical sensor data 744 of FIG. 7) and historical error values 862 (e.g., historical error values 762 of FIG. 7). System 800 of FIG. 8 shows data set generator 872, data inputs 810, and target output 820.

In some embodiments, data set generator 872 generates a data set (e.g., training set, validating set, testing set) that includes one or more data inputs 810 (e.g., training input, validating input, testing input) and one or more target outputs 820 that correspond to the data inputs 810. The data set also includes mapping data that maps the data inputs 810 to the target outputs 820. Data inputs 810 also are referred to as "features," "attributes," or information." In some embodiments, data set generator 872 provides the data set to the training engine 782, validating engine 784, or testing engine 786, where the data set is used to train, validate, or test the machine learning model 790. Some embodiments of generating a training set further is described with respect to FIG. 10A.

In some embodiments, data set generator 872 generates the data input 810 and target output 820. In some embodiments, data inputs 810 include one or more sets of historical sensor data 844. Each instance of historical sensor data 844 includes one or more of sensor data from one or more types of sensors, combination of sensor data from one or more types of sensors, patterns from sensor data from one or more types of sensors, etc.

In some embodiments, data set generator 872 generates a first data input corresponding to a first set of historical sensor data 844A to train, validate, or test a first machine learning model and the data set generator 872 generates a second data input corresponding to a second set of historical sensor data 844B to train, validate, or test a second machine learning model.

In some embodiments, the data set generator 872 discretizes (e.g., segments) one or more of the data input 810 or the target output 820 (e.g., to use in classification algorithms for regression problems). Discretization (e.g., segmentation via a sliding window) of the data input 810 or target output 820 transforms continuous values of variables into discrete values. In some embodiments, the discrete values for the data input 810 indicate discrete historical sensor data 844 to obtain a target output 820 (e.g., discrete error values 862).

Data inputs 810 and target outputs 820 to train, validate, or test a machine learning model includes information for a particular facility (e.g., for a particular semiconductor manufacturing facility). For example, the historical sensor data 844 are for the same manufacturing facility. In another example, historical sensor data 844 and historical error values 862 are for the same manufacturing facility.

In some embodiments, the information used to train the machine learning model is from specific types of manufacturing equipment 724 of the manufacturing facility having specific characteristics and allow the trained machine learning model to determine outcomes for a specific group of manufacturing equipment 724 based on input for current sensor data (e.g., current sensor data 752) associated with one or more components sharing characteristics of the specific group. In some embodiments, the information used to train the machine learning model is for components from two or more manufacturing facilities and allows the trained machine learning model to determine outcomes for components based on input from one manufacturing facility.

In some embodiments, subsequent to generating a data set and training, validating, or testing a machine learning model 790 using the data set, the machine learning model 790 is further trained, validated, or tested (e.g., current error values 764 of FIG. 7) or adjusted (e.g., adjusting weights associated with input data of the machine learning model 790, such as connection weights in a neural network).

Figure 9:
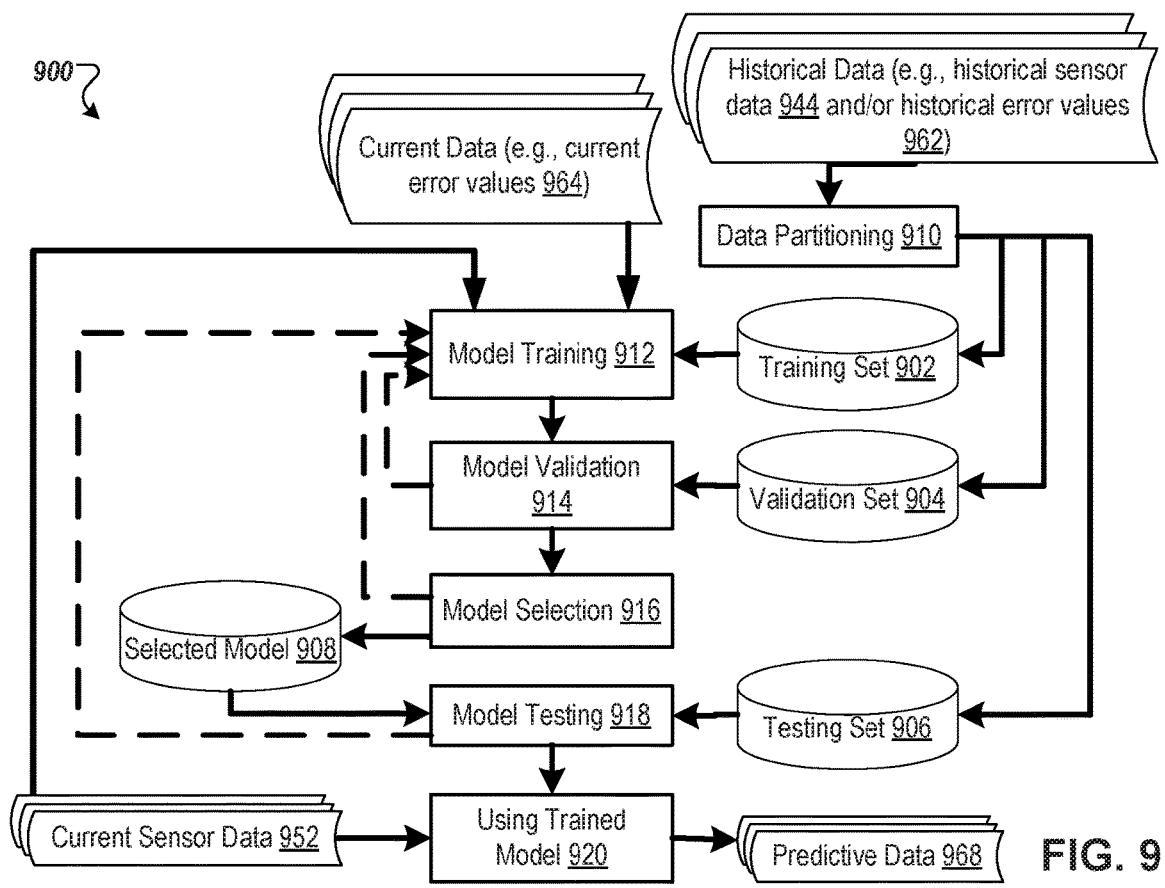
FIG. 9 is a block diagram illustrating determining predictive data, according to certain embodiments.

FIG. 9 is a block diagram illustrating a system 900 for generating predictive data 968 (e.g., predictive data 768 of FIG. 7), according to certain embodiments. The system 900 is used to determine a corrective action associated with manufacturing equipment 724 based on the predictive data 968.

At block 910, the system 900 (e.g., predictive system 710 of FIG. 7) performs data partitioning (e.g., via data set generator 772 of server machine 770 of FIG. 7) of the historical data (e.g., historical sensor data 944, historical error values 962) to generate the training set 902, validation set 904, and testing set 906. In some examples, the training set is 60% of the historical data, the validation set is 20% of the historical data, and the testing set are 20% of the historical data. The system 900 generates a plurality of sets of features for each of the training set, the validation set, and the testing set. For example, if the historical data includes features derived from sensor data from 20 sensors (e.g., sensors 726 of FIG. 7) and 100 components (e.g., components that each correspond to the sensor data from the 20 sensors), a first set of features are sensors 1-10, a second set of features are sensors 11-20, the training set are components 1-60, the validation set are components 61-80, and the testing set are components 81-100. In this example, the first set of features of the training set would be sensor data from sensors 1-10 for components 1-60.

At block 912, the system 900 performs model training (e.g., via training engine 782 of FIG. 7) using the training set 902. The system 900 trains multiple models using multiple sets of features of the training set 902 (e.g., a first set of features of the training set 902, a second set of features of the training set 902, etc.). For example, system 900 trains a machine learning model to generate a first trained machine learning model using the first set of features in the training set (e.g., sensor data from sensors 1-10 for components 1-60) and to generate a second trained machine learning model using the second set of features in the training set (e.g., sensor data from sensors 11-20 for components 1-60). In some embodiments, the first trained machine learning model and the second trained machine learning model are combined to generate a third trained machine learning model (e.g., which is a better predictor than the first or the second trained machine learning model on its own). In some embodiments, sets of features used in comparing models overlap (e.g., first set of features being sensor data from sensors 1-15 and second set of features being sensor data from sensors 5-20). In some embodiments, hundreds of models are generated including models with various permutations of features and combinations of models.

At block 914, the system 900 performs model validation (e.g., via validation engine 784 of FIG. 7) using the validation set 904. The system 900 validates each of the trained models using a corresponding set of features of the validation set 904. For example, system 900 validates the first trained machine learning model using the first set of features in the validation set (e.g., sensor data from sensors 1-10 for components 61-80) and the second trained machine learning model using the second set of features in the validation set (e.g., sensor data from sensors 11-20 for components 61-80). In some embodiments, the system 900 validates hundreds of models (e.g., models with various permutations of features, combinations of models, etc.) generated at block 912. At block 914, the system 900 determines an accuracy of each of the one or more trained models (e.g., via model validation) and determines whether one or more of the trained models has an accuracy that meets a threshold accuracy. Responsive to determining that none of the trained models has an accuracy that meets a threshold accuracy, flow returns to block 912 where the system 900 performs model training using different sets of features of the training set. Responsive to determining that one or more of the trained models has an accuracy that meets a threshold accuracy, flow continues to block 916. The system 900 discards the trained machine learning models that have an accuracy that is below the threshold accuracy (e.g., based on the validation set).

At block 916, the system 900 performs model selection (e.g., via selection engine 785 of FIG. 7) to determine which of the one or more trained models that meet the threshold accuracy has the highest accuracy (e.g., the selected model 908, based on the validating of block 914). Responsive to determining that two or more of the trained models that meet the threshold accuracy have the same accuracy, flow returns to block 912 where the system 900 performs model training using further refined training sets corresponding to further refined sets of features for determining a trained model that has the highest accuracy.

At block 918, the system 900 performs model testing (e.g., via testing engine 786 of FIG. 7) using the testing set 906 to test the selected model 908. The system 900 tests, using the first set of features in the testing set (e.g., sensor data from sensors 7-10 for components 81-100), the first trained machine learning model to determine the first trained machine learning model meets a threshold accuracy (e.g., based on the first set of features of the testing set 906). Responsive to accuracy of the selected model 908 not meeting the threshold accuracy (e.g., the selected model 908 is overly fit to the training set 902 and/or validation set 904 and is not applicable to other data sets such as the testing set 906), flow continues to block 912 where the system 900 performs model training (e.g., retraining) using different training sets corresponding to different sets of features (e.g., sensor data from different sensors). Responsive to determining that the selected model 908 has an accuracy that meets a threshold accuracy based on the testing set 906, flow continues to block 920. In at least block 912, the model learns patterns in the historical data to make predictions and in block 918, the system 900 applies the model on the remaining data (e.g., testing set 906) to test the predictions.

At block 920, system 900 uses the trained model (e.g., selected model 908) to receive current sensor data 952 (e.g., current sensor data 752 of FIG. 7) and determines (e.g., extracts), from the output of the trained model, predictive data 968 (e.g., predictive data 768 of FIG. 7) to perform corrective actions associated with the manufacturing equipment 724. In some embodiments, the current sensor data 952 corresponds to the same types of features in the historical sensor data 944. In some embodiments, the current sensor data 952 corresponds to a same type of features as a subset of the types of features in historical sensor data 944 that are used to train the selected model 908.

In some embodiments, current data is received. Current data includes current error values 964 (e.g., current error values 764 of FIG. 7). The current data is received from metrology equipment (e.g., metrology equipment 728 of FIG. 7), an LCF device, an aligner device, third party sensor data, and/or via user input. The model 908 is re-trained based on the current data. In some embodiments, a new model is trained based on the current data and the current sensor data 952.

In some embodiments, one or more of the operations 910-920 occur in various orders and/or with other acts not presented and described herein. In some embodiments, one or more of operations 910-920 are not performed. For example, in some embodiments, one or more of data partitioning of block 910, model validation of block 914, model selection of block 916, or model testing of block 918 are not performed.

FIGS. 10A-D are flow diagrams of methods 1000A-D associated with determining error values to cause a corrective action, according to certain embodiments. Methods 1000A-D are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 1000A-D are performed, in part, by predictive system 710. Method 1000A is performed, in part, by predictive system 710 (e.g., server machine 770 and data set generator 772 of FIG. 7, data set generator 872 of FIG. 8). Predictive system 710 uses method 1000A to generate a data set to at least one of train, validate, or test a machine learning model, in accordance with embodiments of the disclosure. Method 1000B is performed by predictive server 712 (e.g., predictive component 714). Methods 1000C-D are performed by server machine 780 (e.g., training engine 782, etc.). In some embodiments, a non-transitory storage medium stores instructions that when executed by a processing device (e.g., of predictive system 710, of server machine 780, of predictive server 712, etc.) cause the processing device to perform one or more of methods 1000A-D.

For simplicity of explanation, methods 1000A-D are depicted and described as a series of operations. However, operations in accordance with this disclosure can occur in various orders and/or concurrently and with other operations not presented and described herein. Furthermore, not all illustrated operations are performed to implement methods 1000A-D in accordance with the disclosed subject matter. In addition, those skilled in the art will understand and appreciate that methods 1000A-D could alternatively be represented as a series of interrelated states via a state diagram or events.

Figure 10A:
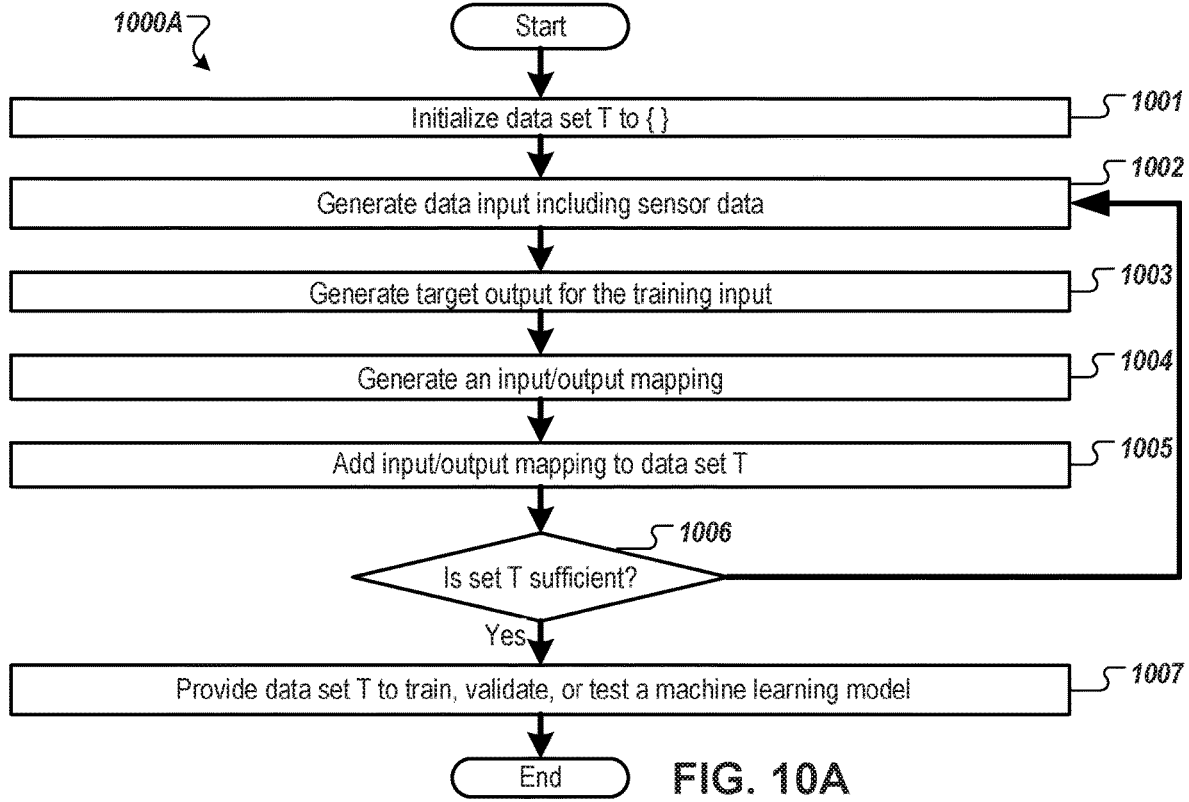
FIGS. 10A-D are flow diagrams of methods associated with determining error values to cause a corrective action, according to certain embodiments.

FIG. 10A is a flow diagram of a method 1000A for generating a data set for a machine learning model for generating predictive data (e.g., predictive data 768 of FIG. 7), according to certain embodiments.

Referring to FIG. 10A, in some embodiments, at block 1001 the processing logic implementing method 1000A initializes a training set T to an empty set.

At block 1002, processing logic generates first data input (e.g., first training input, first validating input) that includes sensor data (e.g., historical sensor data 744 of FIG. 7, historical sensor data 844 of FIG. 8, historical sensor data 944 of FIG. 9). In some embodiments, the first data input includes a first set of features for types of sensor data and a second data input includes a second set of features for types of sensor data (e.g., as described with respect to FIG. 8).

At block 1003, processing logic generates a first target output for one or more of the data inputs (e.g., first data input). In some embodiments, the first target output is historical error values 762.

At block 1004, processing logic optionally generates mapping data that is indicative of an input/output mapping. The input/output mapping (or mapping data) refers to the data input (e.g., one or more of the data inputs described herein), the target output for the data input (e.g., where the target output identifies historical error values 762), and an association between the data input(s) and the target output.

At block 1005, processing logic adds the mapping data generated at block 1004 to data set T.

At block 1006, processing logic branches based on whether data set T is sufficient for at least one of training, validating, and/or testing machine learning model 790. If so, execution proceeds to block 1007, otherwise, execution continues back at block 1002. It should be noted that in some embodiments, the sufficiency of data set T is determined based simply on the number of input/output mappings in the data set, while in some other implementations, the sufficiency of data set T is determined based on one or more other criteria (e.g., a measure of diversity of the data examples, accuracy, etc.) in addition to, or instead of, the number of input/output mappings.

At block 1007, processing logic provides data set T (e.g., to server machine 780) to train, validate, and/or test machine learning model 790. In some embodiments, data set T is a training set and is provided to training engine 782 of server machine 780 to perform the training. In some embodiments, data set T is a validation set and is provided to validation engine 784 of server machine 780 to perform the validating. In some embodiments, data set T is a testing set and is provided to testing engine 786 of server machine 780 to perform the testing. In the case of a neural network, for example, input values of a given input/output mapping (e.g., numerical values associated with data inputs 810) are input to the neural network, and output values (e.g., numerical values associated with target outputs 820) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 1007, machine learning model (e.g., machine learning model 790) can be at least one of trained using training engine 782 of server machine 780, validated using validating engine 784 of server machine 780, or tested using testing engine 786 of server machine 780. The trained machine learning model is implemented by predictive component 714 (of predictive server 712) to generate predictive data 768 for performing corrective action associated with the manufacturing equipment 724.

Figure 10B:
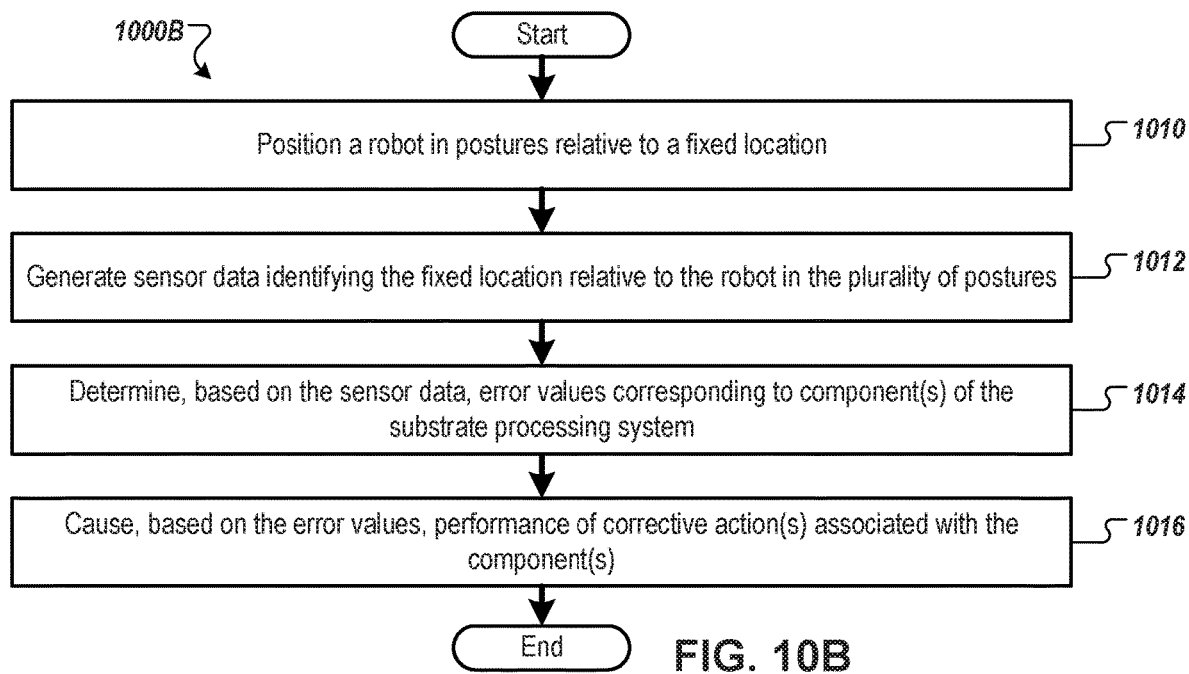

FIG. 10B is a method 1000B for determining error values to perform a corrective action.

At block 1010 of method 1000B, the processing logic positions a robot in postures relative to a fixed location. In some embodiments, the processing logic positions the robot in different postures by isolating movement of one or more portions of the robot (e.g., moving only the joint at the wrist member, etc.).

In some embodiments, responsive to receiving user input of a selection of a load port, the processing logic causes the robot to extend into a substrate carrier (e.g., FOUP, autoteach enclosure system), the processing logic causes the robot to scan a pin in the substrate carrier, and the processing logic causes test get and test put operations to validate a correctly taught station (e.g., posture, location).

In some embodiments, responsive to receiving user input of a selection of an SSP, the processing logic causes the robot to extend into the SSP, the processing logic causes the robot to scan a pin (e.g., permanent pin) in the SSP, and the processing logic causes test get and test put operations to validate a correctly taught station (e.g., posture, location).

In some embodiments, responsive to receiving user input of a selection of a loadlock, the processing logic causes the robot to extend to a location in front of the loadlock body, the processing logic causes the robot to scan one or more permanent offset pins on the loadlock body, and the processing logic causes test get and test put operations to validate a correctly taught station (e.g., posture, location).

In some embodiments, the processing logic causes the robot to scan a cylindrical portion of a pin. In some embodiments, the processing logic determines four locations including: 1) going from off the pin to on a first peripheral edge of the pin; 2) going from on the pin to off the second peripheral edge of the pin; 3) going from off the pin to on the second peripheral edge of the pin; and 4) going from on the pin to off the first peripheral edge of the pin.

In some embodiments, the processing logic causes the robot to scan a base of the pin from different angles. In some embodiments, to provide for calibration, at least a portion of the pin has a shape (e.g., trapezoid) that has skew or asymmetries about the central pin (e.g., cylindrical portion of the pin). The symmetry of a first portion of the pin (e.g., cylindrical portion of the pin) is compared to non-symmetries of a second portion of the pin (e.g., trapezoidal portion of the pin) for calibration. The robot arm performs a movement in the z-direction (e.g., move up or down) to scan the first portion (e.g., cylindrical) and second portion (e.g., trapezoid) of the pin for comparison. The robot arm performs a rotational movement about a single joint to measure the second portion (e.g., trapezoid) from a first angle and from a second angle for comparison. The robot arm performing a movement allows for comparison of joint angles for the same approximate area without having the robot completely change joint posture to scan another object. In some embodiments, for angle detection, a set of offset features (e.g., sides or edges of a trapezoidal portion) that would increase or decrease in separation due to angle of the scan are used.

In some embodiments, the processing logic causes the robot to scan a pin attached to a calibration substrate, transport the calibration substrate to a second location, and scan the pin attached to the calibration substrate again.

In some embodiments, the processing logic causes the robot to place a calibration wafer (e.g., that has a notch and a pin) on an aligner device or an LCF device. The processing logic causes the aligner device or the LCF device to align the calibration wafer using the notch and then the processing logic causes the robot to scan the pin of the calibration wafer from one or more postures.

At block 1012, the processing logic generates sensor data identifying the fixed location relative to the robot in the postures. In some embodiments, the sensor data includes coordinate data points. In some embodiments, the processing logic processes the coordinate data points by one or more of removing outliers, fitting the coordinate data points, performing regression on the coordinate data points, and/or the like.

In some embodiments, the sensor data includes images. In some embodiments, the processing logic processes the images by one or more of identifying edges in the images, cleaning up noise in the images, identifying one or more objects in the images, running the images through one or more filters, converging an implied position and an actual position of objects in the images, and/or the like.

At block 1014, the processing logic determines, based on the sensor data, error values corresponding to components of the substrate processing system.

In some embodiments, one or more equations are determined that represent one or more components of the substrate processing system. In some examples, an equation represents each link length of links of a robot and each joint error of joints of the robot. The sensor data is entered into the equation to determine error values.

In some embodiments, block 1014 of FIG. 10B includes one or more of blocks 1020-1024 of method 1000C and the sensor data is entered into a trained machine learning model to determine the error values.

In some embodiments, the error values include one or more of a fiber beam offset relative to a wafer center of a blade of the robot, motor or gear transmission error per each joint of the robot, elliptical joint error of the robot, link zeroing offset of the robot, different between directed angle and actual angle of a component (e.g., joint of the robot, aligner device, LCF device), different between length and actual length of a component (e.g., link of robot, etc.), and/or the like.

At block 1016, the processing logic causes, based on the error values, performance of corrective actions associated with the components. In some embodiments, the performance of the corrective action includes one or more of: causing movement of the component (e.g., robot, aligner device, LCF device) based on the error values; providing an alert to a user; interrupting functionality of the manufacturing equipment; updating manufacturing parameters; planning replacement of a component of the manufacturing equipment; replacement of one or more components to reduce energy usage; causing preventative maintenance; causing a modification of the components (e.g., tightening mounting screws, replacing binding, etc.); or the like.

In some embodiments, the performance of a corrective action includes performing an auto teach operation based on the error values. Teaching refers to teaching the robot arm the location (e.g., a reference point) of the processing system (e.g., of the substrate carrier, load lock, aligner device, LCF device, etc.). In some examples, the reference point is a center of the enclosure system.

In some embodiments, the performance of a corrective action includes performing a calibration operation based on the error values. Calibration refers to determining errors (e.g., joint kinematic errors, joint hysteresis, and joint backlash) in the movement of a component of the processing system, such as errors of a robot, and to adjusting settings of the component to compensate for the determined errors.

In some embodiments, the robot uses a calibration substrate to perform a calibration operation. A calibration substrate is disposed in the processing system (e.g., on support structures in the interior volume of the substrate carrier). The calibration substrate is substantially horizontal and includes a calibration pin that is secured to an upper surface of the calibration substrate. The robot arm scans the calibration pin to determine a first location of the calibration substrate (e.g., of the calibration pin), removes the calibration substrate from the support structures (e.g., remove the calibration substrate from the substrate carrier), is directed to place the calibration substrate at the first location on the support structures, scans the calibration pin to determine a second location of the calibration substrate, and determines error values (e.g., robot arm error) based on a difference between the first location and the second location.

In some embodiments, the robot uses a calibration wafer to perform a calibration operation. The calibration wafer is substantially horizontal, includes a notch (e.g., on a sidewall of the calibration wafer), and includes a pin that is secured to an upper surface of the calibration wafer. The robot scans an aligner device to determine the location of the aligner device (e.g., X-Y location) and places the calibration wafer on the aligner device. The aligner device rotates the calibration wafer to trigger the mapping fiber on the robot to determine a first location. The robot then rotates (e.g., via a joint angle, such as the wrist joint angle) to trigger the mapping fiber on the robot to determine a second location. The first location and the second location are compared to determine an error value (e.g., yaw error value) of the aligner device and/or robot.

In some embodiments, the performance of a corrective action includes performing a diagnosis operation based on the error values. In some embodiments, the diagnosis operation includes determining whether a component is malfunctioning. In some embodiments, the processing logic determines the change in error values over time to determine a diagnosis of drift, decay of one or more components, a belt becoming loose, a pulley staring to not be lubed or wearing out, a bearing wearing out, whether replacement of a component is to be performed, whether maintenance of a component is to be performed, whether a component is to be investigated further, and/or the like.

In some embodiments, method 1000B is repeated to determine error values and corrective actions for different components of the processing system (e.g., by isolating a component, such as a joint, to determine the error value and corrective action). In some embodiments, responsive to performing a corrective action after one iteration of method 1000B, a second iteration of method 1000B is performed (e.g., using the same or different postures of the robot) to determine if further corrective actions are needed.

Figure 10C:
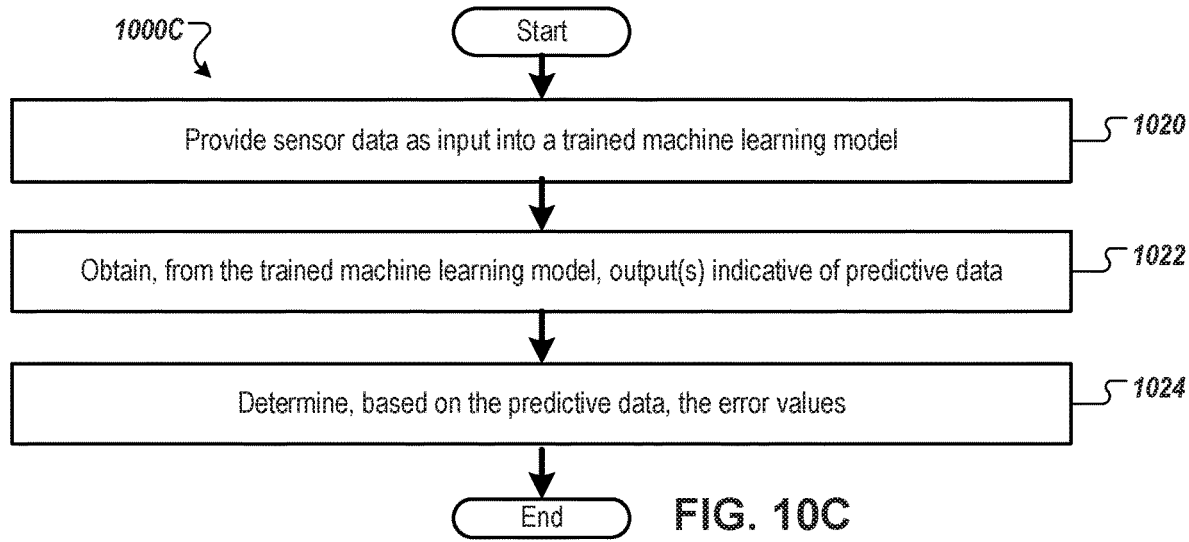

FIG. 10C is a method 1000C for using a trained machine learning model to determine error values to perform a corrective action.

At block 1020, the processing logic provides sensor data as input to a trained machine learning model. In some embodiments, the sensor data is received from a sensor associated with the component (e.g., robot, aligner device, LCF device, etc.) of the processing system. In some embodiments, the trained machine learning model is trained by one or more operations of blocks 1040-1042 of FIG. 10D.

At block 1022, the processing logic obtains from the trained machine learning model, output indicative of predictive data. The predictive data indicates one or more of: predicted abnormalities in movement of components of the manufacturing equipment; predicted abnormalities in components of the manufacturing equipment; predicted component failure; or the like. The predictive data indicates a variation (e.g., from chamber matching for product-to-product uniformity) that is causing an abnormality in the manufacturing equipment. For example, abnormal characteristics of the manufacturing equipment (e.g., difference between directed movement and actual movement) is indicative that a corrective action is to be performed.

At block 1024, the processing logic determines, based on the predictive data, the error values. In some embodiments, the error values include an offset that is to be used in the movement of the components of the processing system.

In some embodiments, the predictive data and/or corrective action performed based on the error values is indicative of a combination (e.g., combination of components, combination of manufacturing parameters) that is causing abnormalities (e.g., where just one of the items from the combination does not cause the abnormality by its own).

In some embodiments, current error values are received corresponding to the current sensor data. The trained machine learning model is re-trained (or a new model is trained) based on the current sensor data and the current error values.

Figure 10D:
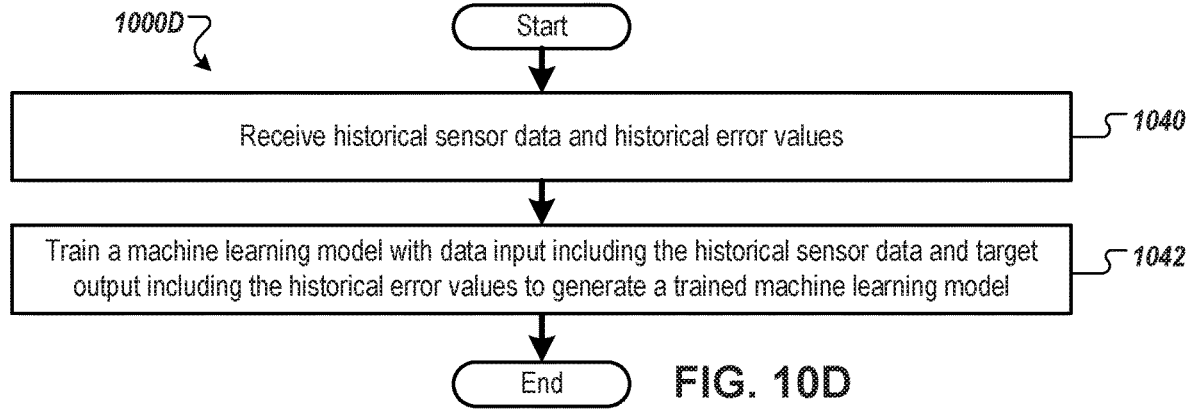

FIG. 10D is a method 1000D for training a machine learning model (e.g., model 790B of FIG. 7) for determining error values (e.g., error values 760 of FIG. 7) to perform a corrective action.

Referring to FIG. 10D, at block 1040, the processing logic receives historical sensor data and historical error values associated with movement of components of manufacturing equipment. In some embodiments, the historical trace data includes coordinate data points and/or images associated with the components relative to one or more fixed locations. In some embodiments, the historical error values include offsets used so that directed movement equals actual movement of the components.

At block 1042, the processing logic trains a machine learning model with data input including the historical sensor data and target output including the historical error values to generate a trained machine learning model. The trained machine learning model is capable of generating outputs indicative of predictive data to perform a corrective action (e.g., see blocks 1022-1024 of FIG. 10C). In some embodiments, the machine learning model is trained using sets of historical sensor data for components that do not have error values (e.g., calibrated components) and/or components that do have error values (e.g., non-calibrated components).

Figure 11:
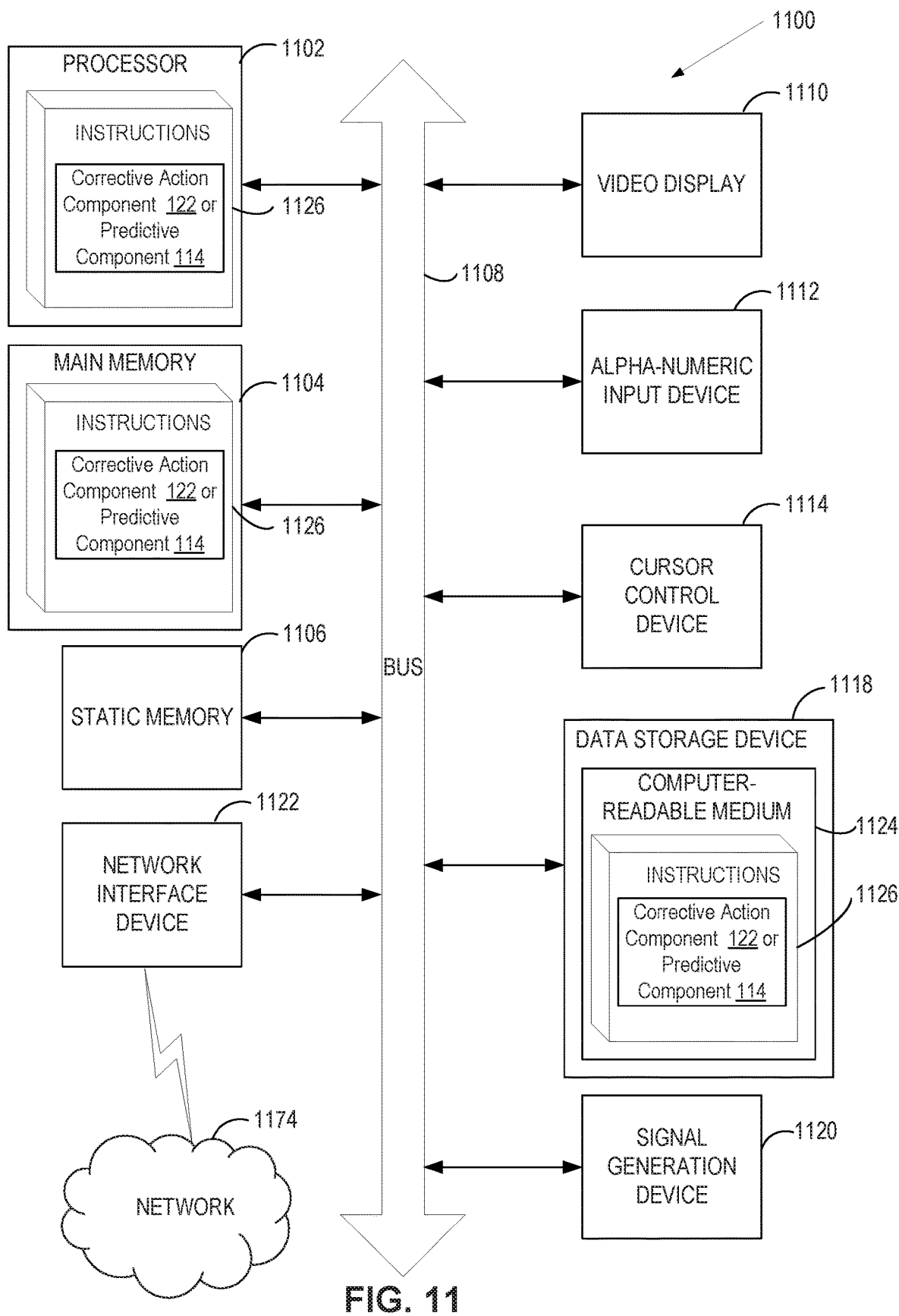
FIG. 11 is a block diagram illustrating a computer system, according to certain embodiments.

FIG. 11 is a block diagram illustrating a computer system 1100, according to certain embodiments. In some embodiments, computer system 1100 is one or more of controller 120 of FIG. 1, controller 228 of FIGS. 2A-B, predictive server 712 of FIG. 7, client device 720 of FIG. 7, and/or the like. In some embodiments, computer system 1100 includes one or more of the components and/or functionalities described in relation to FIG. 11.

In some embodiments, computer system 1100 is connected (e.g., via a network, such as a Local Area Network (LAN), an intranet, an extranet, or the Internet) to other computer systems. Computer system 1100 operates in the capacity of a server or a client computer in a client-server environment, or as a peer computer in a peer-to-peer or distributed network environment. Computer system 1100 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1100 includes a processing device 1102, a volatile memory 1104 (e.g., Random Access Memory (RAM)), a non-volatile memory 1106 (e.g., Read-Only Memory (ROM) or Electrically-Erasable Programmable ROM (EEPROM)), and a data storage device 1116, which communicate with each other via a bus 1108.

Processing device 1102 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 1100 further includes a network interface device 1122 (e.g., coupled to network 1174). Computer system 1100 also includes a video display unit 1110 (e.g., an LCD), an alphanumeric input device 1112 (e.g., a keyboard), a cursor control device 1114 (e.g., a mouse), and a signal generation device 1120.

In some implementations, data storage device 1116 includes a non-transitory computer-readable storage medium 1124 on which stores instructions 1126 encoding any one or more of the methods or functions described herein, including instructions encoding components of FIG. 7 (e.g., corrective action component 722, predictive component 714, etc.) and for implementing methods described herein.

Instructions 1126 also reside, completely or partially, within volatile memory 1104 and/or within processing device 1102 during execution thereof by computer system 1100, hence, volatile memory 1104 and processing device 1102 also constitute machine-readable storage media.

While computer-readable storage medium 1124 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In addition, the methods, components, and features are implemented by firmware modules or functional circuitry within hardware devices. Further, the methods, components, and features are implemented in any combination of hardware devices and computer program components, or in computer programs.

Unless specifically stated otherwise, terms such as "positioning," "generating," "determining," "causing," "applying," "discarding," "providing," "obtaining," "receiving," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or it includes a general purpose computer system selectively programmed by a computer program stored in the computer system. Such a computer program is stored in a computer-readable tangible storage medium.

The methods and illustrative examples described herein are not inherently related to any particular computer or other apparatus. Various general purpose systems are used in accordance with the teachings described herein, or it proves convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limited to the particular apparatuses, assemblies, systems and/or methods disclosed, but, to the contrary, the intention is to cover all modifications, equivalents, and alternatives falling within the scope of the claims.

What is claimed is:

1. A method comprising:
    positioning a robot in a plurality of postures in a substrate processing system relative to a fixed location in the substrate processing system;
    generating sensor data identifying the fixed location relative to the robot in the plurality of postures;
    determining, based on the sensor data, a plurality of error values corresponding to one or more components of the substrate processing system; and
    causing, based on the plurality of error values, performance of one or more corrective actions associated with the one or more components of the substrate processing system.

2. The method of claim 1, wherein the sensor data comprises a plurality of coordinate data points, and wherein the method further comprises:
    applying a linear fit to the plurality of coordinate data points;
    determining at least one of mean, mode, or standard deviation of the linear fit;
    discarding outlier coordinate data points based on the at least one of the mean, the mode, or the standard deviation of the linear fit; and
    determining a second mean of the coordinate data points without the discarded outlier coordinate data points, wherein the plurality of error values comprises the second mean.

3. The method of claim 1, wherein the sensor data comprises a plurality of coordinate data points, and wherein the generating of the plurality of coordinate data points comprises using a light path extending between two points of an end effector coupled to the robot to identify the fixed location by detecting a point on a peripheral edge of the fixed location with the light path.

4. The method of claim 1, wherein the fixed location is one or more of:
    disposed in a substrate enclosure system;
    disposed on a calibration wafer;
    disposed on an aligner device;
    disposed on a location center finder (LCF) device;
    a cylindrical portion of a pin; or
    a trapezoidal base of the pin.

5. The method of claim 1, wherein the sensor data comprises one or more of:
    a plurality of images captured using the robot in the plurality of postures relative to the fixed location;
    a first plurality of coordinate data points identifying the fixed location using the robot in the plurality of postures;
    a second plurality of coordinate data points identifying the fixed location using an aligner device disposed in a transfer chamber of the substrate processing system; or
    a third plurality of coordinate data points identifying the fixed location using a location centering (LCF) device disposed in a factory interface of the substrate processing system.

6. The method of claim 1, wherein the one or more components comprise one or more of:
    an upper arm of the robot;
    a forearm of the robot;
    a wrist member of the robot, wherein an end effector is coupled to the wrist member;
    an aligner device disposed in a transfer chamber of the substrate processing system; or
    a location center finding (LCF) device disposed in a factory interface of the substrate processing system.

7. The method of claim 1, wherein the plurality of error values comprise one or more of:
    a fiber beam offset relative to a wafer center of a blade of the robot;
    motor or gear transmission error per each joint of the robot;
    elliptical joint error of the robot; or
    link zeroing offset of the robot.

8. The method of claim 1, wherein the performance of the one or more corrective actions comprises one or more of:
    performing an auto teach operation;
    performing calibration of the one or more components; or
    performing diagnostics of the one or more components.

9. The method of claim 1, wherein the determining of the plurality of error values comprises:
    providing the sensor data as input into a trained machine learning model;
    obtaining, from the trained machine learning model, one or more outputs indicative of predictive data; and
    determining, based on the predictive data, the plurality of error values.

10. The method of claim 9 further comprising:
    receiving historical sensor data and a plurality of historical error values; and
    training a machine learning model with data input comprising the historical sensor data and target output comprising the plurality of historical error values to generate the trained machine learning model.

11. The method of claim 10, wherein the plurality of historical error values are based on one or more of:
    center values of at least a portion of the historical sensor data;
    convergence of standard deviation of the at least a portion of the historical sensor data;
    location center finding (LCF) sensor data from an LCF device of the substrate processing system;
    aligner sensor data from an aligner device of the substrate processing system; or
    third party sensor data from one or more third party sensors.

12. A non-transitory machine-readable storage medium storing instructions which, when executed cause a processing device to perform operations comprising:
    positioning a robot in a plurality of postures in a substrate processing system relative to a fixed location in the substrate processing system;
    generating sensor data identifying the fixed location relative to the robot in the plurality of postures;
    determining, based on the sensor data, a plurality of error values corresponding to one or more components of the substrate processing system; and
    causing, based on the plurality of error values, performance of one or more corrective actions associated with the one or more components of the substrate processing system.

13. The non-transitory machine-readable storage medium of claim 12, wherein the one or more components comprise one or more of:
    an upper arm of the robot;
    a forearm of the robot;
    a wrist member of the robot, wherein an end effector is coupled to the wrist member;
    an aligner device disposed in a transfer chamber of the substrate processing system; or
    a location center finding (LCF) device located in a factory interface of the substrate processing system.

14. The non-transitory machine-readable storage medium of claim 12, wherein the plurality of error values comprise one or more of:
- a fiber beam offset relative to a wafer center of a blade of the robot;
- motor or gear transmission error per each joint of the robot;
- elliptical joint error of the robot; or
- link zeroing offset of the robot.

15. The non-transitory machine-readable storage medium of claim 12, wherein the determining of the plurality of error values comprises:
- providing the sensor data as input into a trained machine learning model;
- obtaining, from the trained machine learning model, one or more outputs indicative of predictive data; and
- determining, based on the predictive data, the plurality of error values.

16. The non-transitory machine-readable storage medium of claim 15 further comprising:
- receiving historical sensor data and a plurality of historical error values; and
- training a machine learning model with data input comprising the historical sensor data and target output comprising the plurality of historical error values to generate the trained machine learning model.

17. A system comprising:
- a memory; and
- a processing device coupled to the memory, the processing device to:
  - position a robot in a plurality of postures in a substrate processing system relative to a fixed location in the substrate processing system;
  - generate sensor data identifying the fixed location relative to the robot in the plurality of postures;
  - determine, based on the sensor data, a plurality of error values corresponding to one or more components of the substrate processing system; and
  - cause, based on the plurality of error values, performance of one or more corrective actions associated with the one or more components of the substrate processing system.

18. The system of claim 17, wherein the sensor data comprises a plurality of coordinate data points, and wherein the processing device is further to: apply a linear fit to the plurality of coordinate data points;
- determine at least one of mean, mode, or standard deviation of the linear fit;
- discard outlier coordinate data points based on the at least one of the mean, the mode, or the standard deviation of the linear fit; and
- determine a second mean of the coordinate data points without the discarded outlier coordinate data points, wherein the plurality of error values comprises the second mean.

19. The system of claim 17, wherein to determine the plurality of error values, the processing device is to:
- provide the sensor data as input into a trained machine learning model;
- obtain, from the trained machine learning model, one or more outputs indicative of predictive data; and
- determine, based on the predictive data, the plurality of error values.

20. The system of claim 19, wherein the processing device is further to:
- receive historical sensor data and a plurality of historical error values; and
- train a machine learning model with data input comprising the historical sensor data and target output comprising the plurality of historical error values to generate the trained machine learning model.

* * * * *